United States Patent
Suda et al.

(10) Patent No.: US 8,857,002 B2
(45) Date of Patent: Oct. 14, 2014

(54) CLEANING SHEET AND CLEANING IMPLEMENT

(75) Inventors: Tomokazu Suda, Kagawa-ken (JP); Satoshi Hasegawa, Kagawa-ken (JP)

(73) Assignee: Uni-Charm Corporation, Ehime (JP)

( * ) Notice: Subject to any disclaimer, the term of this patent is extended or adjusted under 35 U.S.C. 154(b) by 391 days.

(21) Appl. No.: 13/379,119

(22) PCT Filed: Jun. 18, 2010

(86) PCT No.: PCT/JP2010/060363
§ 371 (c)(1), (2), (4) Date: Mar. 16, 2012

(87) PCT Pub. No.: WO2010/147209
PCT Pub. Date: Dec. 23, 2010

(65) Prior Publication Data
US 2012/0159728 A1    Jun. 28, 2012

(30) Foreign Application Priority Data

Jun. 19, 2009  (JP) .................................. 2009-147072

(51) Int. Cl.
| | |
|---|---|
| A47L 13/17 | (2006.01) |
| B32B 27/00 | (2006.01) |
| B32B 27/24 | (2006.01) |
| B32B 5/02 | (2006.01) |
| B32B 3/02 | (2006.01) |
| A47L 13/20 | (2006.01) |
| B32B 7/02 | (2006.01) |
| B32B 5/00 | (2006.01) |
| B32B 5/24 | (2006.01) |
| B32B 27/28 | (2006.01) |
| B32B 27/12 | (2006.01) |
| B32B 7/00 | (2006.01) |
| B32B 7/04 | (2006.01) |
| B32B 27/02 | (2006.01) |
| B32B 5/06 | (2006.01) |
| B32B 3/00 | (2006.01) |
| B32B 5/26 | (2006.01) |
| B32B 27/06 | (2006.01) |

(52) U.S. Cl.
CPC ............... *A47L 13/20* (2013.01); *B32B 27/00* (2013.01); *B32B 27/24* (2013.01); *B32B 5/022* (2013.01); *B32B 3/02* (2013.01); *B32B 7/02* (2013.01); *B32B 5/00* (2013.01); *B32B 5/02* (2013.01); *B32B 5/24* (2013.01); *B32B 27/28* (2013.01); *B32B 27/12* (2013.01); *B32B 7/00* (2013.01); *B32B 7/04* (2013.01); *B32B 27/02* (2013.01); *B32B 5/06* (2013.01); *B32B 3/00* (2013.01); *B32B 5/26* (2013.01); *B32B 27/06* (2013.01)

USPC .................... 15/104.93; 15/104.94; 15/208

(58) Field of Classification Search
USPC ............... 15/104.93, 104.94, 208, 209.1
See application file for complete search history.

(56) References Cited

U.S. PATENT DOCUMENTS

| | | | |
|---|---|---|---|
| 6,361,784 B1 | 3/2002 | Brennen et al. | |
| 7,350,257 B2 * | 4/2008 | McKay ........................... | 15/118 |

FOREIGN PATENT DOCUMENTS

| | | |
|---|---|---|
| EP | 1 602 309 S1 | 12/2005 |
| JP | 3-9692 | 1/1991 |

(Continued)

OTHER PUBLICATIONS

International Search Report from corresponding PCT application No. PCT/JP2010/060363 dated Aug. 31, 2010 (7 pgs).

(Continued)

*Primary Examiner* — Shay Karls
(74) *Attorney, Agent, or Firm* — Brinks Gilson & Lione

(57) ABSTRACT

Cleaning sheets and cleaning tools that provide a wide cleaning area in a wetted state. A representative cleaning sheet includes a hydrophilic inner layer sheet and hydrophobic outer layer sheets. The inner layer sheet is disposed between the outer layer sheets and impregnated with cleaning solution. Fusion bonded layers are formed on inner sides (sides facing the inner layer sheet) of the outer layer sheets.

12 Claims, 12 Drawing Sheets

(56) References Cited

FOREIGN PATENT DOCUMENTS

| JP | 5-26048 | 4/1993 |
| JP | 2001-198066 A | 7/2001 |
| JP | 2004-033239 A | 2/2004 |
| JP | 2004-509719 A | 4/2004 |
| JP | 2004-313552 A | 11/2004 |
| JP | 2007-014935 A | 1/2007 |

OTHER PUBLICATIONS

International Preliminary Report on Patentability from corresponding PCT application No. PCT/JP2010/060363 dated Jan. 26, 2012 (20 pgs).

European extended Search Report from corresponding European application No. 10789582.3 dated Mar. 4, 2014 (6 pgs).

* cited by examiner

CLEANING SHEET AND CLEANING IMPLEMENT

RELATED APPLICATION

This application is a 35 U.S.C. §371 national phase filing of International Patent Application No. PCT/JP2010/060363, filed Jun. 18, 2010, through which and to which priority is claimed under 35 U.S.C. §119 to Japanese Patent Application No. 2009-147072, filed Jun. 19, 2009.

BACKGROUND OF THE INVENTION

1. Field of the Invention

The invention relates to a cleaning sheet and a cleaning tool, and more particularly to a cleaning sheet and a cleaning tool used for wiping a cleaning object such as a floor.

2. Description of the Related Art

Japanese non-examined laid-open Patent Publication No. 2001-198066 discloses a cleaning sheet having an inner layer sheet and outer layer sheets integrally formed with the inner layer sheet on the both sides of the inner layer sheet. The inner layer sheet has substantially the same area as the outer layer sheets. Further, the inner layer sheet is impregnated with cleaning solution. By using this cleaning sheet, an object to be cleaned is cleaned in a wetted state.

SUMMARY OF THE INVENTION

In a cleaning sheet to be used for cleaning an object to be cleaned in a wetted state, the property of releasing cleaning solution from the outer surface of an outer layer sheet need be properly adjusted. Particularly, in a cleaning sheet having outer layer sheets and an impregnated element (e.g. inner layer sheet) provided between the outer layer sheets and impregnated with cleaning solution, the property of releasing cleaning solution from the outer surfaces of the outer layer sheets varies depending on the property of releasing cleaning solution from the impregnated element to the outer layer sheets.

In the known cleaning sheet, it is difficult to properly adjust the property of releasing cleaning solution from the inner layer sheet (impregnated element impregnated with cleaning solution) to the outer layer sheets.

Accordingly, it is an object of the invention to provide cleaning sheets and cleaning tools which can easily control the amount of release of cleaning solution.

Above described object can be achieved by the claimed invention. As one aspect of the invention, a representative first aspect of the invention relates to a cleaning sheet having hydrophobic first and second nonwoven fabric sheets and a hydrophilic impregnated element impregnated with cleaning solution. It is essential for the first and second nonwoven fabric sheets to be generally hydrophobic, and the first and second nonwoven fabric sheets may be formed of hydrophobic fibers and hydrophilic fibers. Further, it is essential for the impregnated element to be hydrophilic as a whole, and the impregnated element may be formed of hydrophilic fibers and hydrophobic fibers. Suitably, the impregnated element is formed only of hydrophilic fibers. Further, the impregnated element can have various shapes. Suitably, a single sheet or a plurality of sheets can be used as the impregnated element. The first and second nonwoven fabric sheets are bonded together with the impregnated element disposed between the first and second nonwoven fabric sheets. The impregnated element may be or may not be bonded to the first and second nonwoven fabric sheets. In the construction in which the impregnated element is bonded to the first and second nonwoven fabric sheets, the cleaning solution is released from the impregnated element to the first and second nonwoven fabric sheets via the bonded portions. Therefore, in the construction in which the impregnated element is bonded to the first and second nonwoven fabric sheets, preferably, the bonding area of bonding the impregnated element and the first and second nonwoven fabric sheets is selected with consideration given to the amount of release (property of releasing) of cleaning solution via the bonded portions. Above described cleaning sheet may be typically be provided as disposable.

Further, in this invention, each of the first and second nonwoven fabric sheets has a fusion bonded layer on its side (inner side) facing the impregnated element. In the fusion bonded layer, most of the fibers are joined together by fusion bonding, so that the amount of release of cleaning solution of the impregnated element from the outer surfaces of the first and second nonwoven fabric sheets can be controlled. The first nonwoven fabric sheet, as well as the second nonwoven fabric sheet may preferably include 70% of non-hydrophilic heat plastic fabric fusion bonded to each other. Such non-hydrophilic heat plastic fabric may define hydrophobic surface with a mesh structure. On the other hand, the first nonwoven fabric sheet, as well as the second nonwoven fabric sheet may preferably include remaining 30% of hydrophilic fabric which allows the cleaning solution within the hydrophilic impregnated element from being gradually released from the outer surface of the cleaning sheet. The thickness of the fusion bonded layer is determined according to the amount of release of cleaning solution from the impregnated element to the first and second nonwoven fabric sheets.

In another embodiment of the first aspect of the invention, the first and second nonwoven fabric sheets are formed of fibers containing thermoplastic fibers. Thermoplastic fibers provided on the inner sides (the sides facing the impregnated element) of the first and second nonwoven fabric sheets has a lower melting point than thermoplastic fibers provided on the outer sides (the sides opposite from the sides facing the impregnated element). In this case, a fusion bonded layer can be formed on the inner sides of the first and second nonwoven fabric sheets by heating the first and second nonwoven fabric sheets at a temperature which is higher than the melting point of the thermoplastic fibers provided on the inner sides of the first and second nonwoven fabric sheets and lower than the melting point of the thermoplastic fibers provided on the outer sides. Suitably, the melting points of the thermoplastic fibers provided on the inner and outer sides of the first and second nonwoven fabric sheets are set such that fusion bonding is hardly caused on the outer sides of the first and second nonwoven fabric sheets.

In this embodiment, the fusion bonded layer can be easily formed on the inner sides of the first and second nonwoven fabric sheets. In the construction in which the first and second nonwoven fabric sheets are formed of fibers containing thermoplastic fibers, bonding between the hydrophilic impregnated element and the first and second nonwoven fabric sheets and bonding between the first and second nonwoven fabric sheets can be easily achieved via the thermoplastic fibers.

In a further embodiment of the first aspect of the invention, a third nonwoven fabric sheet is used as the impregnated element. A single nonwoven fabric sheet or a plurality of nonwoven fabric sheets may be used as the third nonwoven fabric sheet. Suitably, the third nonwoven fabric sheet is formed only of hydrophilic fibers, such as rayon fibers having high moisture retentivity. As a matter of course, the third nonwoven fabric sheet may also be formed of hydrophilic fibers and hydrophobic fibers.

Further, in the first aspect of the invention, a space may also be formed between the impregnated element and the first and second nonwoven fabric sheets. In this case, the amount of release of cleaning solution from the impregnated element to the first and second nonwoven fabric sheets can be further controlled.

As to the above described aspect, the fusion bonded layer may be provided only with the first nonwoven fabric sheet. The fusion bonded layer may be provided with any region within the first and/or second nonwoven fabric sheets. Further, each of the first nonwoven fabric sheet and the second nonwoven fabric sheet may be separately formed as a single unitary sheet body and then connected to each other. Otherwise, the first nonwoven fabric sheet and the second nonwoven fabric sheet may be integrally formed as a single unitary sheet body from the beginning and then, may be connected at each ends.

Further, as a second aspect of the invention, a cleaning sheet may preferably be provided to include:

a hydrophobic first nonwoven fabric sheet, a hydrophobic second nonwoven fabric sheet and a third nonwoven fabric sheet as a single unitary sheet body, the third nonwoven fabric sheet impregnated with cleaning solution and disposed between the first nonwoven sheet and the second nonwoven sheet, a main cleaning area provided with the first nonwoven fabric sheet corresponding to the disposition of the third nonwoven fabric sheet, a bonding area to bond the third nonwoven fabric sheet to the first nonwoven fabric sheet, the bonding area being an area outside the main cleaning area and a space provided at the main cleaning area between the first nonwoven fabric sheet and the third nonwoven fabric sheet, wherein the space controls the amount of release of cleaning solution of the third nonwoven fabric sheet from the outer surface of the first nonwoven fabric sheet. The second aspect of the invention relates to a cleaning sheet having hydrophobic first and second nonwoven fabric sheets, and a hydrophilic third nonwoven fabric sheet impregnated with cleaning solution. It is essential for the first and second nonwoven fabric sheets to be hydrophobic as a whole, and the first and second nonwoven fabric sheets may be formed of hydrophobic fibers and hydrophilic fibers. Further, it is essential for the third nonwoven fabric sheet to be hydrophilic as a whole, and the third nonwoven fabric sheet may be formed of hydrophilic fibers and hydrophobic fibers. Typically, the third nonwoven fabric sheet is formed only of hydrophilic fibers, such as rayon fibers having high moisture retentivity. Various kinds of known nonwoven fabric sheets can be used as the first and second nonwoven fabric sheets and as the third nonwoven fabric sheet. In this invention, the cleaning sheet has a three-layer structure having the third nonwoven fabric sheet disposed between the first and second nonwoven fabric sheets.

In this invention, a single nonwoven fabric sheet is used as the third nonwoven fabric sheet. The third nonwoven fabric sheet is fixed to the first and second nonwoven fabric sheets by bonding. An appropriate method, such as hot embossing method, can be used for bonding the third nonwoven fabric sheet to the first and second nonwoven fabric sheets. In the construction in which the third nonwoven fabric sheet is bonded to the first and second nonwoven fabric sheets, the cleaning solution is released from the third nonwoven fabric sheet to the first and second nonwoven fabric sheets via the bonded portions. In this invention, the bonding area of bonding the single third nonwoven fabric sheet to the first and second nonwoven fabric sheets is located on edges of the first or second nonwoven fabric sheet. The edges of the first and second nonwoven fabric sheets are located away from the center of an area (main cleaning area) of the cleaning sheet which is used for normal cleaning operation. Specifically, in this invention, the third nonwoven fabric sheet is bonded to the first and second nonwoven fabric sheets at a location in which the cleaning operation is less affected by such bonding. Therefore, in this invention, a non-bonded space (clearance) exists between the third nonwoven fabric sheet and the first and second nonwoven fabric sheets in the area (main cleaning area) of the cleaning sheet which is used for normal cleaning operation. The space works as a reservoir for the cleaning solution and the amount of release of cleaning solution from the third nonwoven fabric sheet to the first and second nonwoven fabric sheets in the main cleaning area can be controlled.

In this invention, a single nonwoven fabric sheet is used as the third nonwoven fabric sheet, and the third nonwoven fabric sheet is bonded to the first and second nonwoven fabric sheets on the edges of the first or second nonwoven fabric sheet. As a result, the third nonwoven fabric sheet can be impregnated with a larger amount of cleaning solution. Further, the amount of release of cleaning solution from the third nonwoven fabric sheet to the first and second nonwoven fabric sheets in the main cleaning area can be controlled. Therefore, a cleaning region (cleaning area) which can be cleaned in a wetted state can be widened.

In another embodiment of the second aspect of the invention, each of the first and second nonwoven fabric sheets has a fusion bonded layer on its side (inner side) facing the third nonwoven fabric sheet. In the fusion bonded layer, most of the fibers are joined together by fusion bonding, so that the amount of release of cleaning solution from the third nonwoven fabric sheet to the first and second nonwoven fabric sheets and as a result, the amount of release of cleaning solution from the outer surfaces of the first and second nonwoven fabric sheets can be controlled. The thickness of the fusion bonded layer is determined according to the amount of release of cleaning solution from the third nonwoven fabric sheet to the first and second nonwoven fabric sheets.

In this embodiment, the fusion bonded layer is formed on the inner sides of the first and second nonwoven fabric sheets and serves to control the amount of release of cleaning solution from the third nonwoven fabric sheet to the first and second nonwoven fabric sheets. Therefore, the amount of release of cleaning solution from the third nonwoven fabric sheet to the first and second nonwoven fabric sheets can be further controlled.

In a further embodiment of the second aspect of the invention, the first and second nonwoven fabric sheets are formed of fibers containing thermoplastic fibers. Thermoplastic fibers provided on the sides (inner sides) of the first and second nonwoven fabric sheets facing the third nonwoven fabric sheet has a lower melting point than thermoplastic fibers provided on the sides (outer sides) opposite from the sides facing the third nonwoven fabric sheet. In this embodiment, a fusion bonded layer can be formed on the inner sides of the first and second nonwoven fabric sheets, for example, by heating the first and second nonwoven fabric sheets at a temperature which is higher than the melting point of the thermoplastic fibers provided on the inner sides of the first and second nonwoven fabric sheets and lower than the melting point of the thermoplastic fibers provided on the outer sides. Suitably, the melting points of the thermoplastic fibers provided on the inner and outer sides of the first and second nonwoven fabric sheets are set such that fusion bonding is hardly caused on the outer sides of the first and second nonwoven fabric sheets.

In this embodiment, the fusion bonded layer can be easily formed on the inner sides of the first and second nonwoven fabric sheets.

Further, as a third aspect of the invention, a cleaning sheet attachable to a cleaning tool with a cleaning sheet mounting member having a mounting side and lock pieces, the cleaning sheet having a central portion placed on the mounting side of the cleaning sheet mounting member and having end portions formed on the both sides of the central portion and held by the lock pieces of the cleaning sheet mounting member may preferably be provided. The cleaning sheet may include:

a hydrophobic first nonwoven fabric sheet, a hydrophobic second nonwoven fabric sheet, a hydrophilic impregnated element impregnated with cleaning solution, the impregnated element being disposed between the first nonwoven sheet and the second nonwoven sheet, wherein the first nonwoven fabric sheet and the second nonwoven fabric sheet are bonded to each other while the impregnated element is disposed at the central portion between the first and second nonwoven fabric sheets. The third aspect of the invention relates to a cleaning sheet having hydrophobic first and second nonwoven fabric sheets and a hydrophilic impregnated element impregnated with cleaning solution. The cleaning sheet of this invention has a central portion which is placed on a mounting side of a cleaning sheet mounting member of a cleaning tool, and end portions which are formed on the both sides of the central portion and held by lock pieces of the cleaning sheet mounting member. It is essential for the first and second nonwoven fabric sheets to be hydrophobic as a whole, and the first and second nonwoven fabric sheets may be formed of hydrophobic fibers and hydrophilic fibers. Further, it is essential for the impregnated element to be hydrophilic as a whole, and the impregnated element may be formed of hydrophilic fibers and hydrophobic fibers. Suitably, the impregnated element is formed only of hydrophilic fibers. Further, the impregnated element can have various shapes. Suitably, a single sheet or a plurality of sheets are used as the impregnated element. The first and second nonwoven fabric sheets are bonded together with the impregnated element disposed between the first and second nonwoven fabric sheets. The impregnated element may be or may not be bonded to the first and second nonwoven fabric sheets. The bonding method or bonding area of bonding the first and second nonwoven fabric sheets can be appropriately selected. In the construction in which the impregnated element is bonded to the first and second nonwoven fabric sheets, the cleaning solution is released from the impregnated element to the first and second nonwoven fabric sheets via the bonded portions. Therefore, in the construction in which the impregnated element is bonded to the first and second nonwoven fabric sheets, preferably, the bonding area of bonding the impregnated element and the first and second nonwoven fabric sheets is selected with consideration given to the amount of release (property of releasing) of cleaning solution via bonded portions. For example, the impregnated element is bonded to the first and second nonwoven fabric sheets on edges of the first or second nonwoven fabric sheet.

In this invention, the impregnated element is disposed in the central portion of the cleaning sheet between the first and second nonwoven fabric sheets. Therefore, in the area (the central portion of the cleaning sheet) which is used for normal cleaning operation, the cleaning solution is released to the first and second nonwoven fabric sheets, while, in the area (the end portions of the cleaning sheet) which is not used for normal cleaning operation, the cleaning solution is not released to the first and second nonwoven fabric sheets. Therefore, the cleaning solution can be efficiently used. Further, the user's fingers can be prevented from contacting the cleaning solution when the user holds the end portions of the cleaning sheet and locks them by the lock pieces of the cleaning sheet mounting member.

In another embodiment of the third aspect of the invention, each of the first and second nonwoven fabric sheets has a fusion bonded layer on its side (inner side) facing the impregnated element. In the fusion bonded layer, most of the fibers are joined together by fusion bonding, so that the amount of release of cleaning solution from the impregnated element to the first and second nonwoven fabric sheets, or the amount of release of cleaning solution from the outer surfaces of the first and second nonwoven fabric sheets can be controlled. The thickness of the fusion bonded layer is determined according to the amount of release of cleaning solution from the impregnated element to the first and second nonwoven fabric sheets.

In this embodiment, the amount of release of cleaning solution from the impregnated element to the first and second nonwoven fabric sheets can be controlled by the fusion bonded layers formed on the inner sides of the first and second nonwoven fabric sheets.

Further, in the third aspect of the invention, a space may also be formed between the impregnated element and the first and second nonwoven fabric sheets. In this case, the amount of release of cleaning solution from the impregnated element to the first and second nonwoven fabric sheets can be further controlled.

In a further embodiment of the third aspect of the invention, the first and second nonwoven fabric sheets are formed of fibers containing thermoplastic fibers. Thermoplastic fibers provided on the sides (inner sides) of the first and second nonwoven fabric sheets facing the impregnated element has a lower melting point than thermoplastic fibers provided on the sides (outer sides) opposite from the sides facing the impregnated element. In this embodiment, a fusion bonded layer can be formed on the inner sides of the first and second nonwoven fabric sheets, for example, by heating the first and second nonwoven fabric sheets at a temperature which is higher than the melting point of the thermoplastic fibers provided on the inner sides of the first and second nonwoven fabric sheets and lower than the melting point of the thermoplastic fibers provided on the outer sides. Suitably, the melting points of the thermoplastic fibers provided on the inner and outer sides of the first and second nonwoven fabric sheets are set such that fusion bonding is hardly caused on the outer sides of the first and second nonwoven fabric sheets.

In this embodiment, the fusion bonded layer can be easily formed on the inner sides of the first and second nonwoven fabric sheets.

In a further embodiment of the third aspect of the invention, a third nonwoven fabric sheet is used as the impregnated element. A single nonwoven fabric sheet or a plurality of nonwoven fabric sheets may be used as the third nonwoven fabric sheet. Suitably, the third nonwoven fabric sheet is formed only of hydrophilic fibers, such as rayon fibers having high moisture retentivity. As a matter of course, the third nonwoven fabric sheet may also be formed of hydrophilic fibers and hydrophobic fibers.

In a further embodiment of the first, second and third aspect of the inventions, a nonwoven fabric sheet (spun lace nonwoven fabric sheet) having a patterned indented surface and manufactured by a hydroentangling method (water jet method) is used as the third nonwoven fabric sheet. The pitch (interval) of indentations is set within the range of 2.0 to 10.0 mm, or more suitably, within the range of 2.0 to 3.0 mm. In this manner, the specific volume ratio of the third nonwoven fabric sheet can be increased. If the pitch of indentations exceeds 10.0 mm, the strength may decrease and loss of fibers may be caused.

In a further embodiment of the first, second and third aspect of the inventions, surfaces of the first and second nonwoven fabric sheets are subjected to hot embossing. Specifically, a hot embossed portion is formed on the surfaces of the first and second nonwoven fabric sheets (the surface of the cleaning sheet) by hot embossing. The shape and position of the hot embossed portion are determined according to the decorative pattern which appears on the surface of the cleaning sheet. The hot embossed portion may be formed all over the surfaces of the first and second nonwoven fabric sheets (the surface of the cleaning sheet) or on the surfaces except for a region in which the impregnated element or the third nonwoven fabric sheet is placed.

In this embodiment, the hot embossed portion is formed on the surfaces of the first and second nonwoven fabric sheets (the surface of the cleaning sheet), so that the appearance is enhanced.

In a further embodiment of the first, second and third aspect of the inventions, the cleaning sheet has a central portion which is placed on the mounting side of the cleaning sheet mounting member of the cleaning tool, and end portions which are formed on the both sides of the central portion and held by the lock pieces of the cleaning sheet mounting member. Further, slits are formed in the end portions which are held by the lock pieces of the cleaning sheet mounting member, and can be engaged with the lock pieces of the cleaning sheet mounting member. The position, shape and number of the slits can be appropriately set.

In this embodiment, the slits are engaged with the lock pieces of the cleaning sheet mounting member when the end portions of the cleaning sheet are locked by the lock pieces of the cleaning sheet mounting member. Thus, the ease of attachment of the cleaning sheet to the cleaning sheet mounting member (the cleaning tool) can be enhanced.

Other objects, features and advantages of the invention will be readily understood after reading the following detailed description together with the accompanying drawings and the claims.

DETAILED DESCRIPTION OF THE INVENTION

Figure 1:
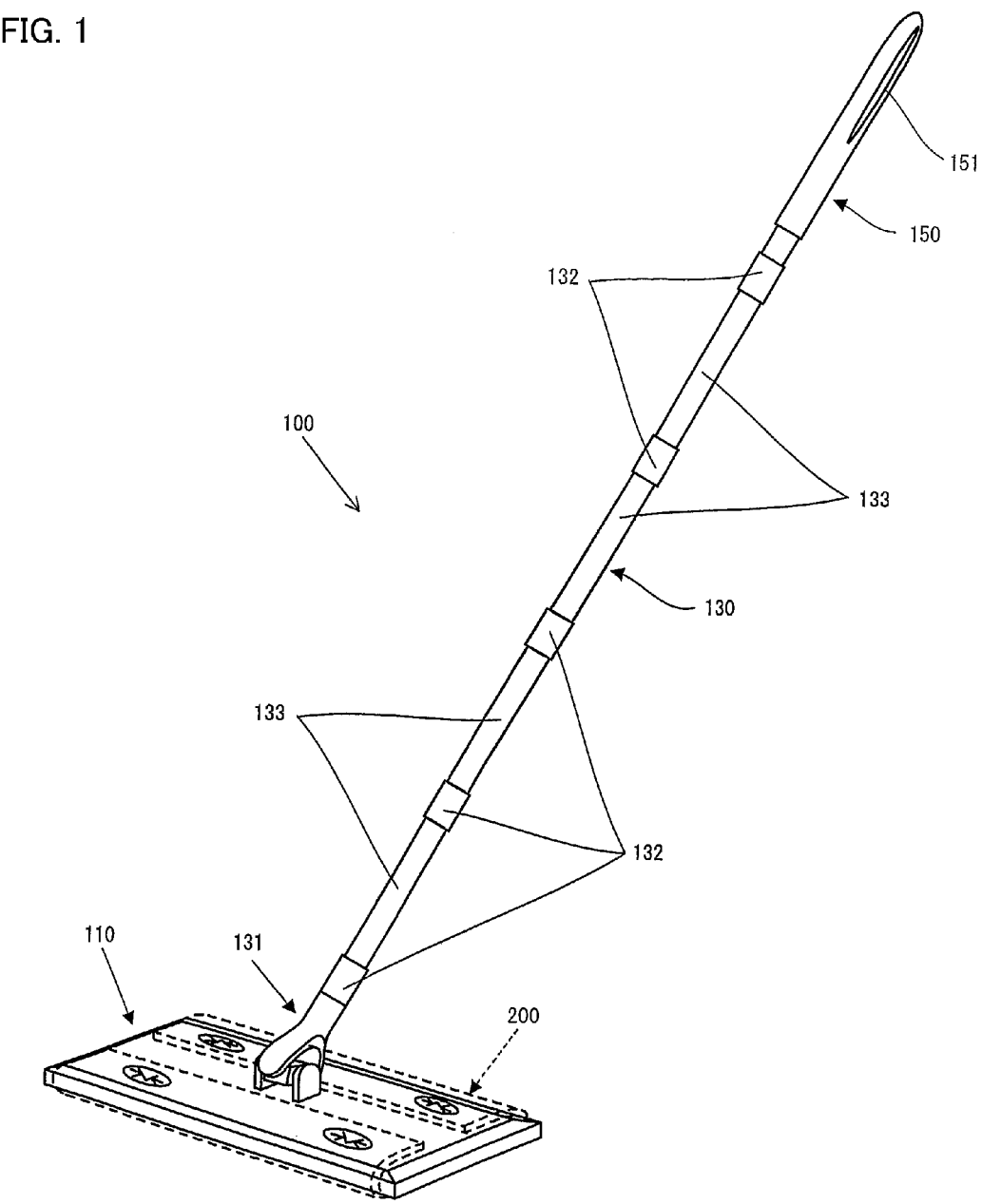
FIG. 1 is a perspective view showing a cleaning tool according to an embodiment of this invention.

Each of the additional features and method steps disclosed above and below may be utilized separately or in conjunction with other features and method steps to provide and manufacture improved cleaning sheets and cleaning tools and method for using such cleaning sheets and cleaning tools and devices utilized therein. Representative examples of the invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. While the claims basically define the scope of the claimed invention, combinations of features and steps disclosed within the following detailed description may not be necessary to practice the invention in the broadest sense, and are instead taught merely to particularly describe some representative examples of the invention, which detailed description will now be given with reference to the accompanying drawings.

An embodiment of the invention is now explained with reference to the drawings. A cleaning tool having a cleaning sheet mounting member and a cleaning sheet mounted to the cleaning sheet mounting member is now explained. Each cleaning sheet which is described below may also be used singly (without being mounted to the cleaning sheet mounting member of the cleaning tool). Further, the cleaning sheet or the cleaning tool of this invention can be used to clean objects having various shapes, such as planar, curved, uneven or stepped shape.

As a cleaning sheet to be used for cleaning an object in a wetted state, for example, a cleaning sheet having an impregnated element (e.g. inner layer sheet) impregnated with cleaning solution, and outer layer sheets disposed on the both sides of the impregnated element is used. In this case, the cleaning region (cleaning area) of an object to be cleaned which can be cleaned by such a cleaning sheet in an appropriate wetted state is determined by the property of releasing the cleaning solution from the outer surfaces of the outer layer sheets. Further, the property of releasing the cleaning solution from the outer surfaces of the outer layer sheets is determined by the property of releasing the cleaning solution from the impregnated element to the outer layer sheets. Further, the property of releasing the cleaning solution from the impregnated element to the outer layer sheets is determined by the amount of cleaning solution which can be impregnated into the impregnated element, or the amount of cleaning solution which is released from the impregnated element to the outer layer sheets. In order to control the amount of cleaning solution which is released from the impregnated element to the outer layer sheets, as described below, a space (clearance) may be provided between the impregnated element and the outer layer sheets, and/or a fusion bonded layer may be formed on the inner sides of the outer layer sheets (facing the impregnated element). An embodiment using a new method for controlling the property of releasing cleaning solution from the impregnated element to the outer layer sheets is described below. In this embodiment, while several methods are used for controlling the property of releasing cleaning solution from the impregnated element to the outer layer sheets, at least any one of the methods may be used.

FIG. 1 is a perspective view showing a cleaning tool 110 according to an embodiment of this invention. The cleaning tool 110 of this embodiment has a head 100 to which a cleaning sheet 200 is attached, a pipe 130 and a handle 150. The pipe 130 is formed by coupling a plurality of pipe elements 133 by coupling mechanisms. Each of the coupling mechanisms includes, for example, a male coupling member provided on one end of one pipe element and a female coupling member provided on the other end of the other pipe element. The connection between the male coupling member and the female coupling member is covered with a cover 132. The one end of the pipe 130 is connected to the handle 150. The other end of the pipe 130 is connected to a connecting mechanism 131 provided on the head 110. In this embodiment, the head 110, the handle 150 and the pipe 130 are features that correspond to the "cleaning sheet mounting member", the "holding member" and the "connecting member for connecting the head and the handle", respectively, according to this invention. The number of the pipe elements 133 forming the pipe 130 can be appropriately selected. Further, the handle 150 may also be directly connected to the connecting mechanism 131 provided on the head 110.

Figure 2:
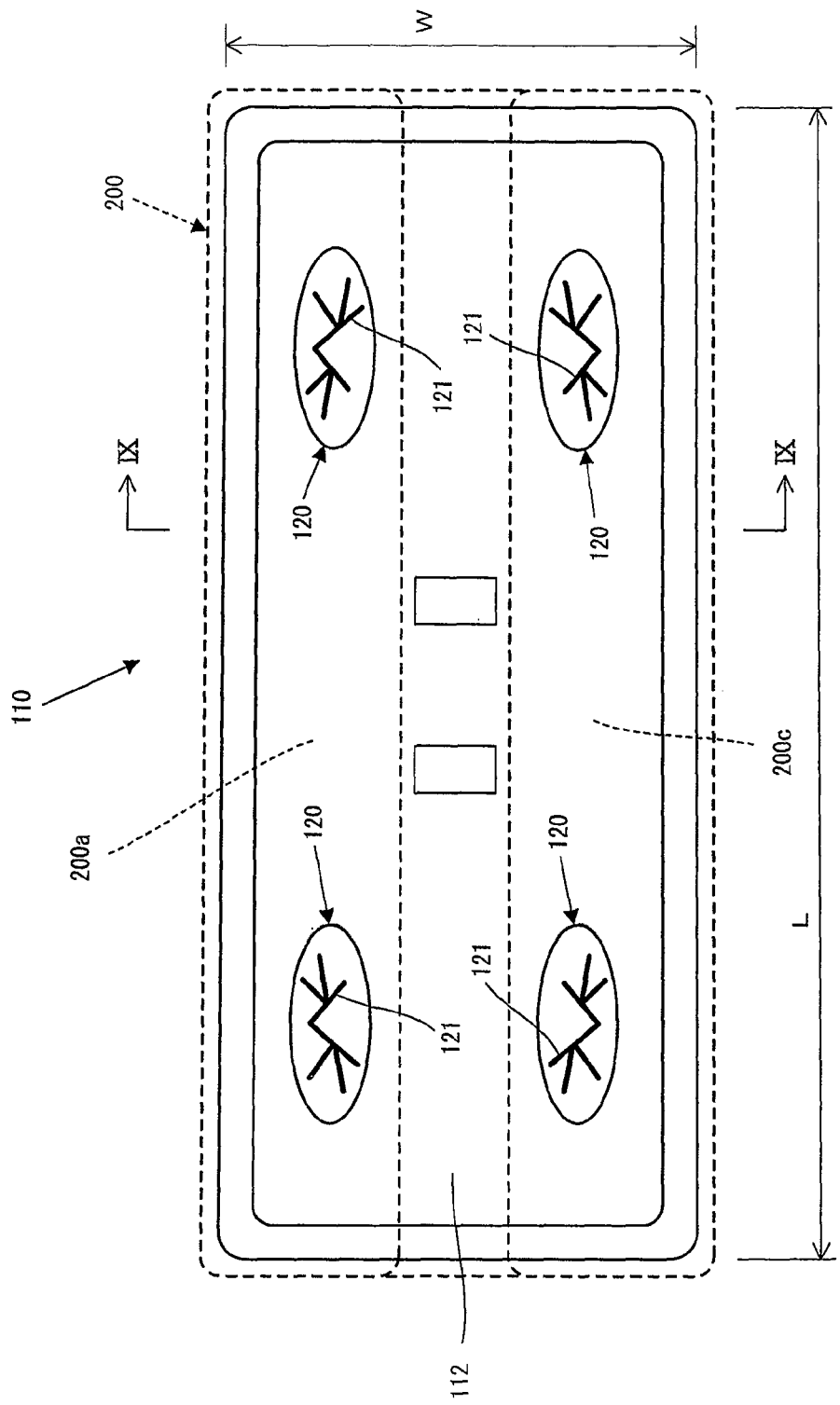
FIG. 2 is a plan view of a head.
Figure 3:
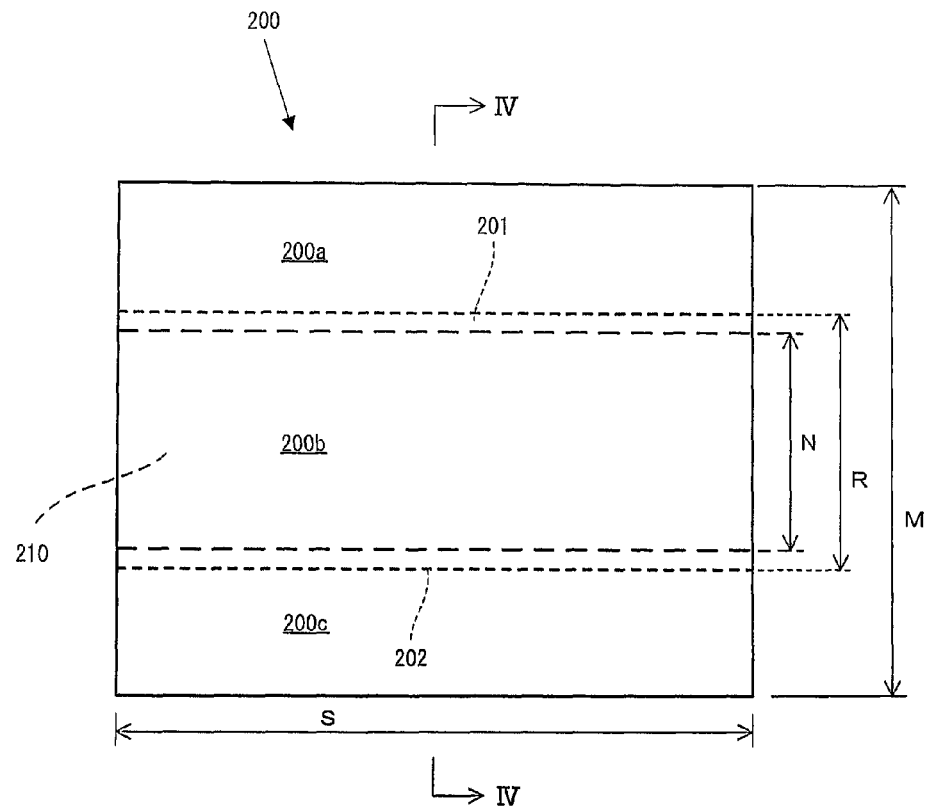
FIG. 3 shows a schematic structure of a cleaning sheet 200 of a first embodiment.

The head 110 is shaped like a plate as shown in FIG. 2 and has an upper side 112 on which the connecting mechanism 131 is mounted, and a lower side (mounting side or cleaning side) 111 (see FIG. 9) opposite from the upper side 112. Lock members 120 for locking ends of the cleaning sheet 200 are provided on the upper side 112. As shown in FIG. 2, each of the lock members 120 has a plurality of elastic lock pieces 121. As shown in FIG. 3, the cleaning sheet 200 has a central portion 200b and end portions 200a, 200c provided on the both sides of the central portion 200b. The central portion 200b of the cleaning sheet 200 is placed to face the lower side (mounting side) 111 of the head 110, and the end portions 200a, 200c are placed on the upper side 112. Specifically, the cleaning sheet 200 is attached to the head 110 such that the head 110 is covered with the central portion 200b and the end portions 200a, 200c. In the state in which the end portions 200a, 200c are placed on the upper side 112, points of the end portions 200a, 200c right on the lock members 120 are pressed down by the user's fingers. Thus, the end portions 200a, 200c of the cleaning sheet 200 are held partly caught between the adjacent lock pieces 121.

In a cleaning sheet according to a first aspect of the invention, a fusion bonded layer is formed on the side (inner side) of the outer layer sheet facing the impregnated element (e.g. inner layer sheet). In a cleaning sheet of a second aspect of the invention, a space is provided between the impregnated element (e.g. inner layer sheet) and the outer layer sheet. In a cleaning sheet of a third aspect of the invention, the impregnated element (e.g. inner layer sheet) is disposed in a central portion of the cleaning sheet.

First Aspect of the Invention

First aspect of the invention is now explained in which a fusion bonded layer is formed on the side (inner side) of the outer layer sheet facing the impregnated element (e.g. inner layer sheet).

First Embodiment

Figure 4:
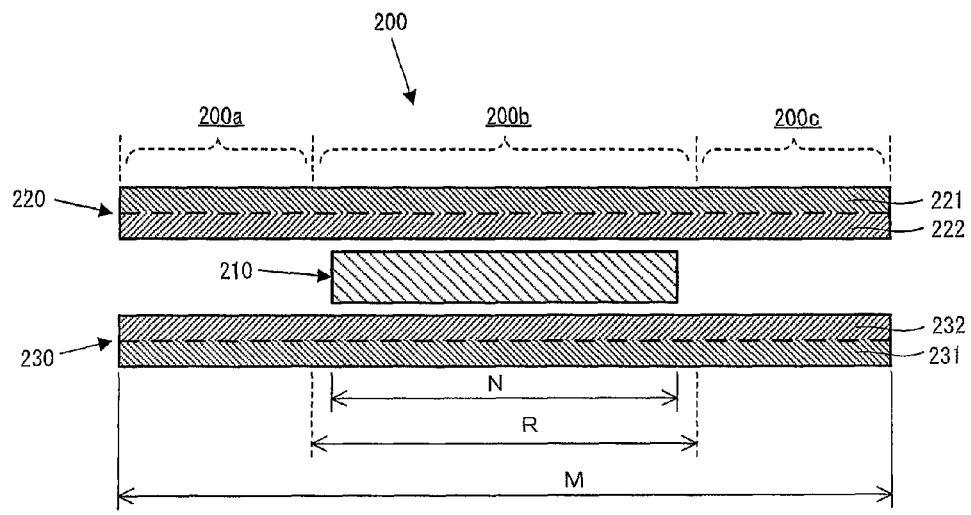
FIG. 4 is a sectional view taken along line IV-IV in FIG. 3.

As shown in FIG. 4, the cleaning sheet 200 of the first embodiment has a three-layer structure having a single inner layer sheet 210 and single outer layer sheets 220, 230 disposed on the both sides of the inner layer sheet 210.

A hydrophilic nonwoven fabric sheet is used as the inner layer sheet 210. It is essential for the hydrophilic nonwoven fabric sheet to be hydrophilic as a whole, and the nonwoven fabric sheet may be formed of hydrophilic fibers and hydrophobic fibers. The hydrophilic fibers include rayon fibers, cotton fibers and pulp fibers. In this embodiment, the nonwoven fabric sheet is formed only of rayon fiber having high water absorbency and high moisture retentivity. The inner layer sheet 210 is a feature that corresponds to the "impregnated element" or the "third nonwoven fabric sheet" according to this invention.

A nonwoven fabric sheet (spun lace nonwoven fabric sheet) manufactured by a water jet method (hydroentangling method) is used as the inner layer sheet 210. In the water jet method, spun lace nonwoven fabric of intertlaced fibers is manufactured by jetting high-pressure water, for example, onto a web of randomly arranged fibers from a plurality of nozzles disposed in an orientation transverse to the feeding direction of the web. In this embodiment, each of the nozzles for jetting high-pressure water has orifices having a diameter of 92 µm and continuously arranged over the width of 2.0 mm and such nozzles are arranged at intervals (orifice pitches) of 3.0 mm. By using such nozzles, air-through portions are formed in the spun lace nonwoven fabric, and a striped pattern appears on a finished spun lace nonwoven fabric. Thus, the specific volume ratio of the inner layer sheet 210 is increased, so that the amount of impregnation (the amount of water retention) of the inner layer sheet 210 is increased. The striped pattern is a feature that corresponds to the pattern of the "patterned indented surface of the inner layer sheet" according to this invention. The orifice pitch (interval of indentations) is set within the range of 2.0 to 10.0 mm, or more suitably, within the range of 2.0 to 3.0 mm. If the orifice pitch exceeds 10.0 mm, fibers are more loosely entangled with each other, so that fluff loss of fibers is increased. Further, the strength decreases, so that it becomes difficult to form the nonwoven fabric sheet only of hydrophilic fibers. The inner layer sheet 210 may also be manufactured by other methods, such as through-air bonding, spun bonding, thermal bonding, spun lacing, point bonding, melt blowing, chemical bonding and air-laid methods.

The basis weight of the inner layer sheet 210 is preferably set within the range of 40 to 70 gsm from the viewpoint of the amount of release of the cleaning solution, but it may exceed 70 gsm.

A hydrophobic nonwoven fabric sheet is used as the outer layer sheets 220, 230. It is essential for the hydrophobic nonwoven fabric sheet to be hydrophobic as a whole, and the nonwoven fabric sheet may be formed of hydrophilic fibers and hydrophobic fibers. The hydrophobic fibers include polyethylene terephthalate (PET) fibers, polyethylene (PE) fibers, polypropylene (PP) fibers and nylon fibers. One of the outer layer sheets 220, 230 and the other are features that correspond to the "first nonwoven fabric sheet" and the "second nonwoven fabric sheet", respectively, according to this invention.

Further, in this embodiment, a spun lace nonwoven fabric sheet manufactured by a water jet method (hydroentangling method) is used as the outer layer sheets 220, 230. The outer layer sheets 220, 230 may also be manufactured by other various methods.

In the cleaning sheet 200 of this embodiment, as shown in FIG. 4, the outer layer sheet 220 (230) has a two-layer structure having a layer (inner layer) 222 (232) facing the inner layer sheet 210, and a layer (outer layer) 221 (231) on the opposite side from the side facing the inner layer sheet 210.

The outer layer sheets 220, 230 of this embodiment are formed of fibers mainly consisting of thermoplastic fibers. Thermoplastic fibers forming the inner layers 222, 232 have a lower melting point than thermoplastic fibers forming the outer layers 221, 231.

The outer layer sheets 220, 230 consist, for example, of polyethylene terephthalate (PET) fibers which are thermoplastic fibers, in major proportions and of rayon fibers. For example, the compounding ratio of polyethylene terephthalate (PET) fibers and rayon fibers is 80% by weight:20% by weight. Further, the polyethylene terephthalate (PET) fibers consist of those having a fineness of 1.1 dtex and those having a fineness of 3.3 at the ratio of 30% by weight:50% by weight.

As the thermoplastic fibers forming the inner layers 222, 232, polyethylene (PE) fibers/polyethylene terephthalate (PET) fibers (core-in-sheath structure) are used. For example, the compounding ratio of polyethylene (PE) fibers/polyethylene terephthalate (PET) fibers and rayon fibers is 70% by weight:30% by weight.

The basis weight of the outer layer sheets 220, 230 is preferably set within the range of 35 to 40 gsm from the viewpoints of the functionality, productivity, costs, etc., though, if it exceeds 30 gsm, there is no particular problem from the viewpoints of the amount of release of the cleaning solution.

By thus forming the inner layers 222, 232 of the outer layer sheets 220, 230 by using thermoplastic fibers having a lower melting point than thermoplastic fibers of the outer layers 221, 231, even if the inner layer sheet 210 contains no thermoplastic fibers, the inner layer sheet 210 and the outer layer sheets 220, 230 can be bonded together by the thermoplastic fibers having a lower melting point which are contained in the inner layer 222 of the outer layer sheet 220 and the inner layer 232 of the outer layer sheet 230.

When the outer layer sheet 220 (230) having the inner layer 222 (232) and the outer layer 221 (231) is heated at a temperature which is higher than the melting point of the thermoplastic fibers of the inner layer 222 (232) and lower than the melting point of the thermoplastic fibers of the outer layer 221 (231), a fusion bonded layer is formed in the inner layer 222 (232). As a result, most of the fibers in the inner layer 222 (232) of the outer layer sheet 220 (230) are joined together by fusion bonding, so that the amount of the cleaning solution which is released from the inner layer sheet 210 to the outer layer sheet 220 (230) is controlled.

Further, in this embodiment, as shown in FIGS. 3 and 4, the inner layer sheet 210 has a shorter width N (e.g. 90 mm) than a width M (e.g. 205 mm) of the outer layer sheets 220, 230. A length S of the inner layer sheet 210 is substantially equal to a length S of the outer layer sheets 220, 230. Further, the inner layer sheet 210 is centrally located between the outer layer sheets 220, 230 in the width direction of the outer layer sheets 220, 230. In this embodiment, a direction (the horizontal direction as viewed in FIG. 3) along folding lines 201, 202 which are described below is referred to as the "width direction". In the case of the cleaning sheet 200 having no folding lines 201, 202, one direction of the cleaning sheet 200 is referred to as the "length direction", and a direction transverse (perpendicular) to the one direction is referred to as the "width direction".

Folding lines 201, 202 are formed on the cleaning sheet 200. The cleaning sheet 200 is divided into the central portion 200*b* and the end portions 200*a*, 200*c* provided on the both sides of the central portion 200*b*.

In this embodiment, the inner layer sheet 210 is disposed in the central portion 200*b* of the cleaning sheet 200. Therefore, when the cleaning sheet 200 is attached to the head 110 of the cleaning tool 100, the inner layer sheet 210 is placed to face the lower side (cleaning side) 111 of the head 110. The folding lines 201, 202 serve as guides for positioning the central portion 200*b* of the cleaning sheet 200 so as to face the lower side (cleaning side) 111 of the head 110.

A width R of the central portion 200*b* of the cleaning sheet 200 (distance between the folding lines 201, 202) is preferably equal to or shorter than a width W of the lower side (mounting side) 111 of the head 110 of the cleaning tool 100 on which the central portion 200*b* of the cleaning sheet 200 is placed (R≤W). Further, a width N of the inner layer sheet 210 is preferably equal to or shorter than the width W of the lower side (mounting side) 111 of the head 110 of the cleaning tool 100 (N≤W). The relationship between the distance R, the width N and the width W is not limited to this.

Figure 5:
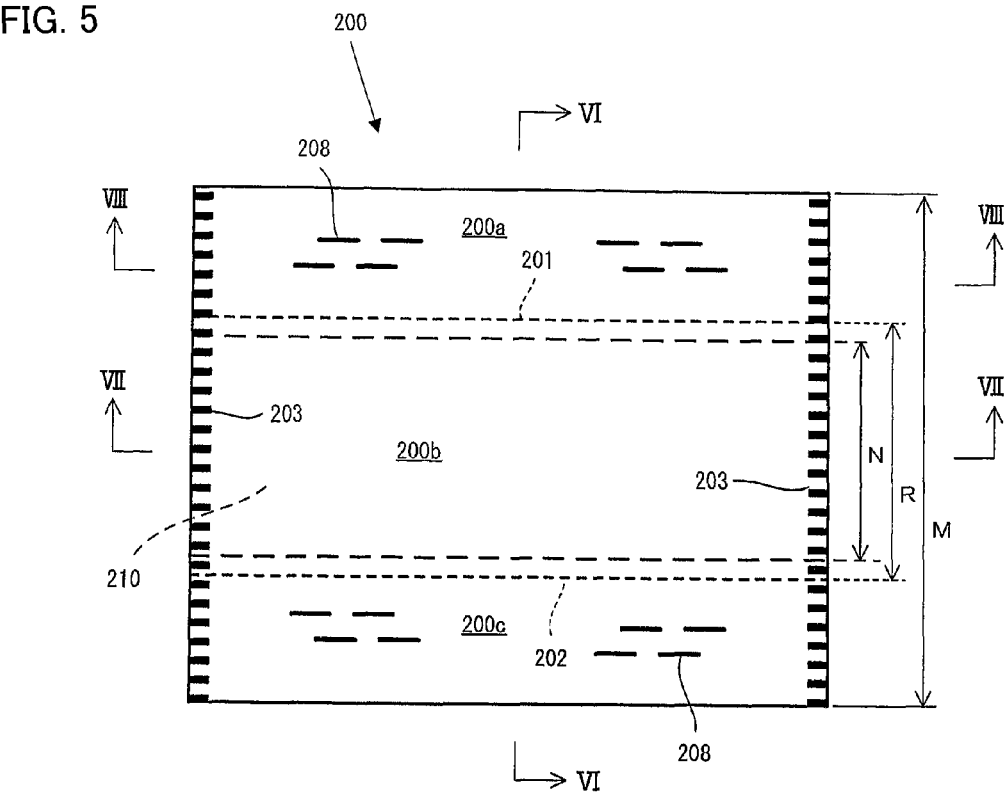
FIG. 5 shows the cleaning sheet 200 of the first embodiment in the unfolded state.
Figure 6:
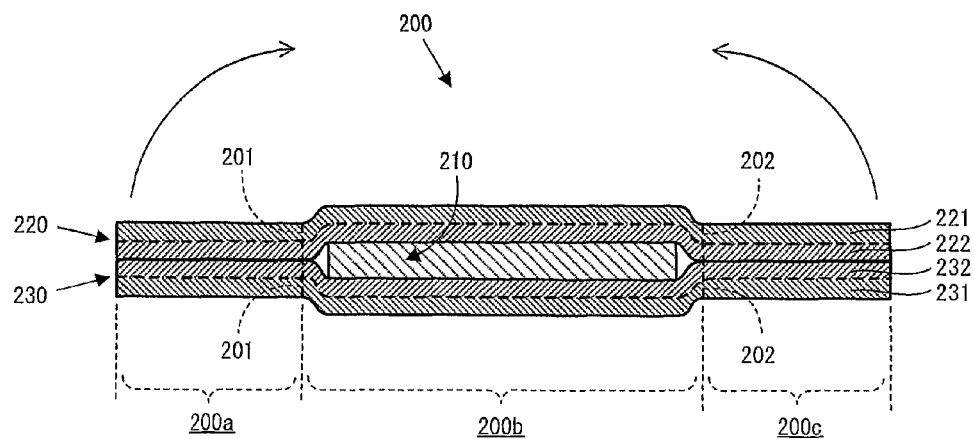
FIG. 6 is a sectional view taken along line VI-VI in FIG. 5.
Figure 7:
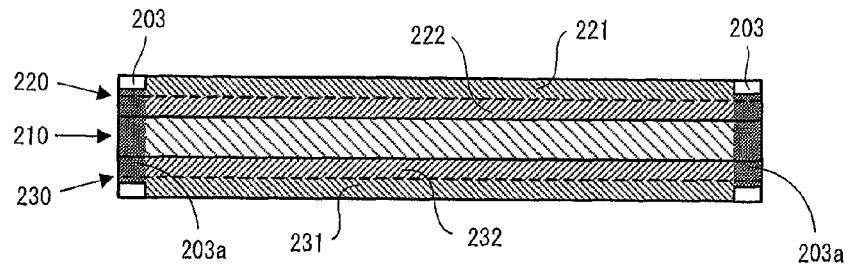
FIG. 7 is a sectional view taken along line VII-VII in FIG. 5.
Figure 8:
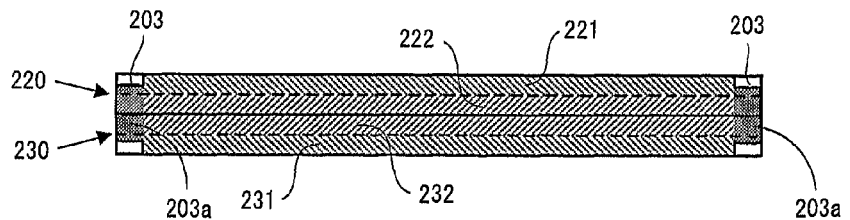
FIG. 8 is a sectional view taken along line VIII-VIII in FIG. 5.

The cleaning sheet 200 is formed by bonding the inner layer sheet 210 and the outer layer sheets 220, 230 in the state in which the inner layer sheet 210 and the outer layer sheets 220, 230 are arranged as shown in FIGS. 3 and 4. The cleaning sheet 200 of this embodiment is shown in FIGS. 5 to 8. FIG. 5 shows the cleaning sheet 200 in the unfolded state. FIG. 6 is a sectional view taken along line VI-VI (in the width direction) in FIG. 5. FIG. 7 is a sectional view taken along line VII-VII (in the length direction) in FIG. 5. FIG. 8 is a sectional view taken along line VIII-VIII (in the length direction) in FIG. 5.

The inner layer sheet 210 is fixed to the outer layer sheets 220, 230 by bonding the inner layer sheet 210 to the outer layer sheets 220, 230. The cleaning solution impregnated into the inner layer sheet 210 is released from the inner layer sheet 210 to the outer layer sheets 220, 230 via bonded portions between the inner layer sheet 210 and the outer layer sheets 220, 230. Therefore, a bonding area of bonding the inner layer sheet 210 and the outer layer sheets 220, 230 is preferably located away from the center of an area of the cleaning sheet which is used for normal cleaning operation. In other words, the bonding area is preferably located at a location in which the cleaning operation is less affected by the cleaning solution via the bonded portions. In this embodiment, the central portion 200*b* of the cleaning sheet 200 is disposed to face the lower side (mounting side) 111 of the head 110 of the cleaning tool 100, and therefore, cleaning is performed with the central portion 200*b* of the cleaning sheet 200. Thus, the central portion 200*b* of the cleaning sheet 200 forms a "main cleaning area". Therefore, in this embodiment, as shown in FIG. 5, the inner layer sheet 210 is bonded to edges (ends) of the outer layer sheets 220, 230. Specifically, the bonding area of bonding the inner layer sheet 210 and the outer layer sheets 220, 230 is located away from the center of an area (main cleaning area) of the cleaning sheet which is used for normal cleaning operation. In FIG. 5, the inner layer sheet 210 is bonded to the outer layer sheets 220, 230 on edges of the outer layer sheets 220, 230 on the both ends in the length direction (horizontal direction as viewed in FIG. 5).

Various methods can be used for such bonding. In this embodiment, a hot embossing method is used for the bonding. In FIG. 5, hot embossed portions 203 are formed on the edges of the outer layer sheets 220, 230 on the both ends in the length direction. In this embodiment, the outer layer sheets 220, 230 are formed of fibers containing thermoplastic fibers. Therefore, the inner layer sheet 210 is bonded to the outer layer sheets 220, 230, or the outer layer sheets 220, 230 are bonded together, via the thermoplastic fibers forming the outer layer sheets 220, 230 (particularly, the thermoplastic fibers having a lower melting point which are contained in the inner layer 222 of the outer layer sheet 220 and the inner layer 232 of the outer layer sheet 230) by hot embossing the outer layer sheets 220, 230.

In this specification, hot embossing for bonding the inner layer sheet 210 and the outer layer sheets 220, 230 is referred to as the "first hot embossing".

By thus bonding the inner layer sheet 210 and the outer layer sheets 220, 230 on the edges of the outer layer sheets 220, 230, a bonded portion is not formed in a central portion of an area (the central portion 200b located to face the lower side 111 of the head 110) which is used for cleaning operation with the cleaning sheet 200 attached to the head 110. As a result, the amount of the cleaning solution which is released from the inner layer sheet 210 to the outer layer sheets 220, 230 via the central portion 200b of the cleaning sheet 200 can be controlled. Specifically, the amount of the cleaning solution which is released from the main cleaning area can be controlled.

Further, with the arrangement in which the inner layer sheet 210 is disposed in the central portion 200b of the cleaning sheet 200, a larger amount of cleaning solution is distributed in the central portion 200b of the cleaning sheet 200, while a smaller amount of cleaning solution is distributed in the end portions 200a, 200c of the cleaning sheet 200. With such distribution property, the cleaning solution is released from the area (the central portion 200b of the cleaning sheet 200) which is used for normal cleaning operation, and the cleaning solution is not released from the area (the end portions 200a, 200c of the cleaning sheet 200) which is not used for normal cleaning operation. Therefore, the cleaning solution can be efficiently used. Further, the user's fingers can be prevented from contacting the cleaning solution when the user holds the end portions 200a, 200c of the cleaning sheet 200 and locks them by the lock pieces 121 of the lock members 120.

Further, slits 208 are formed in the end portions 200a, 200c of the cleaning sheet 200. The slits 208 are formed such that they can be engaged with the lock pieces 121 when the end portions 200a, 200c of the cleaning sheet 200 are locked by the lock pieces 121 of the lock members 120. The shape, position and number of the slits 208 can be appropriately set. By provision of the slits 208, the cleaning sheet 200 can be easily attached to the head 110.

Further, the inner layer sheet 210 is impregnated with cleaning solution. An appropriate cleaning solution by which dirt or contamination of the object to be cleaned can be removed can be used as the cleaning solution. For example, water-based cleaning solution containing alcohol, a surfactant, a solvent, an antiseptic, etc. can be used. Further, a floor protective agent, an abrasive, a freshener, perfume, etc. may be added to the cleaning solution. The amount of cleaning solution to be impregnated into the inner layer sheet 210 can be appropriately determined. For example, cleaning solution of 2 to 5 times the weight of the yet-to-be impregnated cleaning sheet 200 (the inner layer sheet 210 and the outer layer sheets 220, 230) is impregnated into the inner layer sheet 210. Various methods can be used for impregnating the cleaning solution into the inner layer sheet 210. For example, the cleaning sheet 200 may be formed by using the inner layer sheet 210 which is impregnated with the cleaning solution in advance. Alternatively, after the cleaning sheet 200 is formed, the cleaning solution may be applied to the central portion 200b of the outer layer sheets 220, 230 so that the inner layer sheet 210 is impregnated with the cleaning solution via the outer layer sheets 220, 230.

Although, in FIGS. 6 to 8, the inner layer sheet 210 appears bonded to the outer layer sheets 220, 230, the inner layer sheet 210 is bonded to the outer layer sheets 220, 230 only on the edges of the outer layer sheets 220, 230 as described above.

As shown in FIGS. 7 and 8, the hot embossed portions 203 and bonded portions 203a in which the inner layer sheet 210 is bonded to the outer layer sheets 220, 230 are formed by hot embossing the outer layer sheets 220, 230 (first hot embossing).

Figure 9:
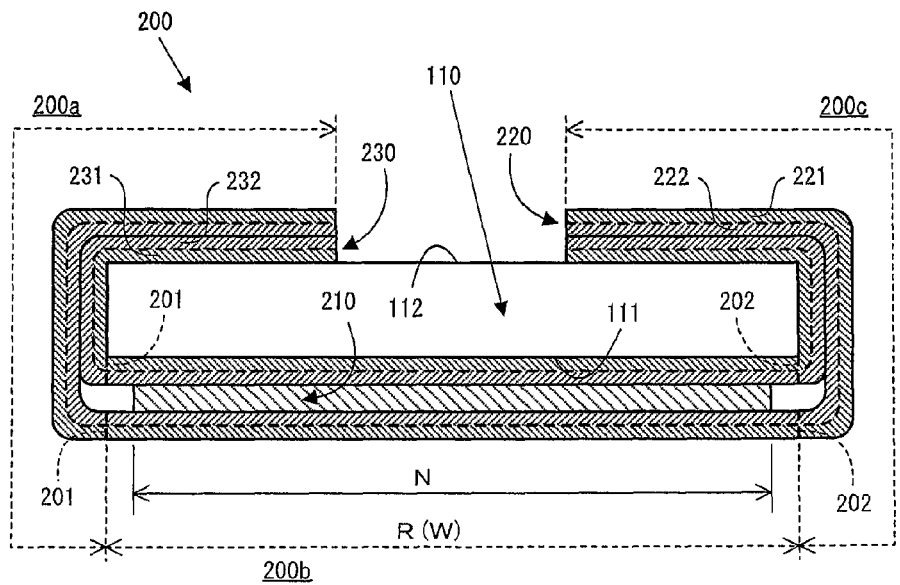
FIG. 9 is a sectional view taken along line IX-IX in FIG. 2.

FIG. 9 shows the cleaning sheet 200 attached to the head 110. FIG. 9 is a sectional view taken along line IX-IX (in the width direction) in FIG. 2. As shown in FIG. 9, the central portion 200b of the cleaning sheet 200 is located to face the lower side (mounting side) 111 of the head 110. The end portions 200a, 200c of the cleaning sheet 200 are folded over along the folding lines 201, 202 and held by the lock pieces 121 of the lock members 120 on the upper side 112 of the head 110.

Second Embodiment

Figure 10:
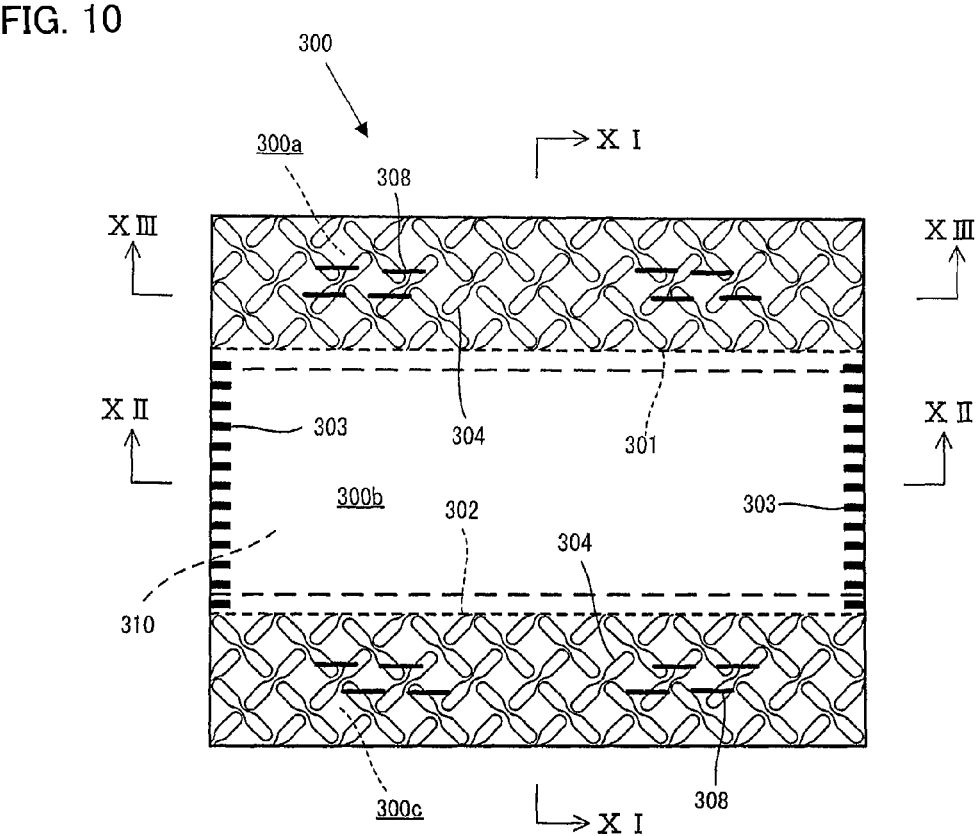
FIG. 10 shows a cleaning sheet 300 of a second embodiment in the unfolded state.
Figure 11:
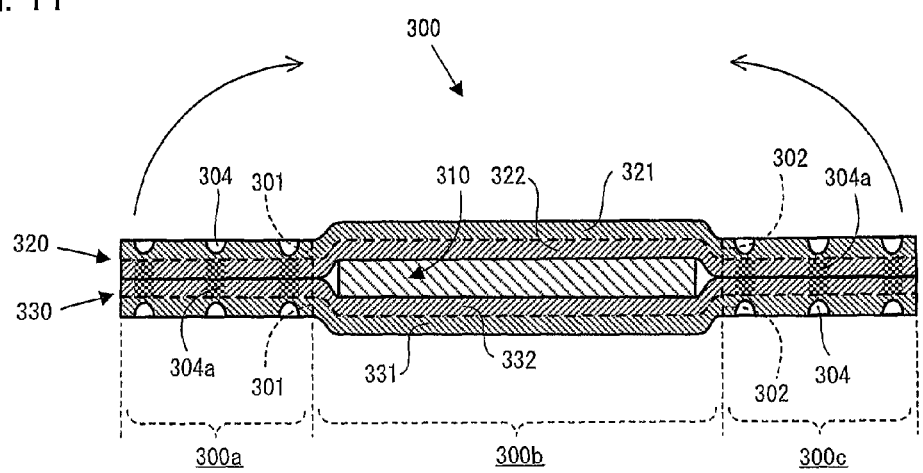
FIG. 11 is a sectional view taken along line XI-XI in FIG. 10.
Figure 12:
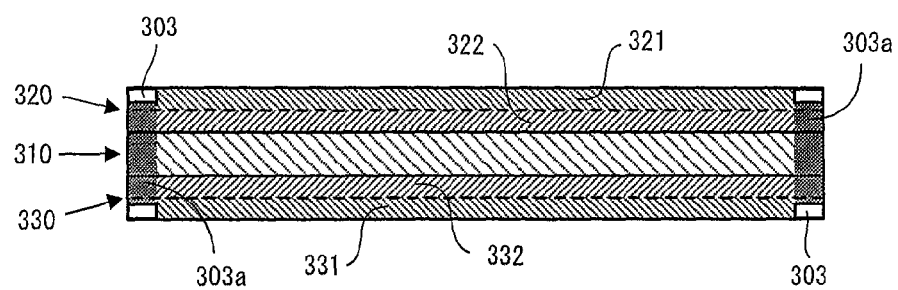
FIG. 12 is a sectional view taken along line XII-XII in FIG. 10.
Figure 13:
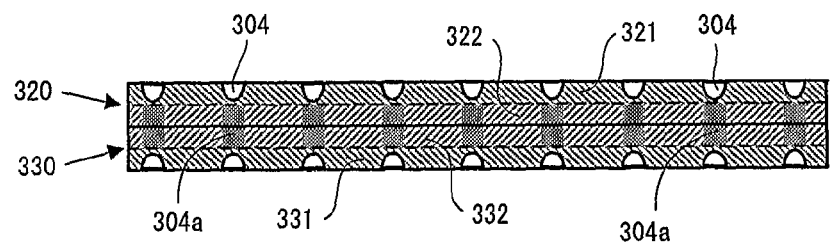
FIG. 13 is a sectional view taken along line XIII-XIII in FIG. 10.

A cleaning sheet 300 according to a second embodiment is now explained with reference to FIGS. 10 to 13. FIG. 10 shows the cleaning sheet 300 of the second embodiment in the unfolded state. FIG. 11 is a sectional view taken along line XI-XI (in the width direction) in FIG. 10. FIG. 12 is a sectional view taken along line XII-XII (in the length direction) in FIG. 10. FIG. 13 is a sectional view taken along line XIII-XIII (in the length direction) in FIG. 10. In this embodiment, decorative hot embossed portions 304 are formed on end portions 300a, 300c of the cleaning sheet 300.

Like the cleaning sheet 200 of the first embodiment, the cleaning sheet 300 of this embodiment includes a hydrophilic single inner layer sheet 310 and hydrophobic single outer layer sheets 320, 330. Further, inner layers 322, 332 formed of fusion bonded layers are provided on the inner sides of the outer layer sheets 320, 330 (facing the inner layer sheet 310).

The inner layer sheet 310 has a shorter width than the width of the outer layer sheets 320, 330 and is centrally located between the outer layer sheets 320, 330 in the width direction of the outer layer sheets 320, 330.

Edges of the outer layer sheets 320, 330 on the both ends in the length direction are subjected to hot embossing (first hot embossing) for bonding the inner layer sheet 310 and the outer layer sheets 320, 330. In this embodiment, as described below, the end portions 300a, 300c of the cleaning sheet 300 are subjected to hot embossing in order to form hot embossed portions 304. Therefore, only the central portion 300b of the cleaning sheet 300 is subjected to hot embossing (first hot embossing) for bonding the inner layer sheet 310 and the outer layer sheets 320, 330. By this hot embossing, hot embossed portions 303 and bonded portions 303a in which the inner layer sheet 310 is bonded to the outer layer sheets 320, 330 are formed. Further, the end portions 300a, 300c of the cleaning sheet 300 may also be subjected to the hot embossing (first hot embossing) for bonding the inner layer sheet 310 and the outer layer sheets 320, 330.

Further, slits 308 are formed in the end portions 300a, 300c of the cleaning sheet 300 and can be engaged with the lock pieces 121 of the lock members 120.

In the cleaning sheet 300 of this embodiment, the inner layer sheet 310 impregnated with cleaning solution is not disposed in the end portions 300a, 300c of the cleaning sheet 300. Therefore, in this embodiment, the surfaces of the outer layer sheets 320, 330 are subjected to hot embossing in the end portions 300a, 300c of the cleaning sheet 300 in order to form the hot embossed portions 304. The hot embossed portions 304 are formed such that a desired decorative pattern appears on the surface of the cleaning sheet 300 (which corresponds to the end portions 300a, 300c). As a result, the appearance of the cleaning sheet 300 is enhanced.

Thermoplastic fibers having a lower melting point are contained in the inner layer 322 of the outer layer sheet 320 and the inner layer 332 of the outer layer sheet 330 as described above. Therefore, when the surfaces of the outer layer sheets 320, 330 are subjected to hot embossing for forming the hot embossed portions 304, bonded portions 304a are formed in the inner layer 322 of the outer layer sheet 320 and the inner layer 332 of the outer layer sheet 330. The inner layer 322 of the outer layer sheet 320 and the inner layer 332 of the outer layer sheet 330 are bonded together by the bonded portions 304a.

In this specification, hot embossing for forming the bonded portions 304a, or hot embossing for bonding the outer layer sheets 320, 330 is referred to as the "second hot embossing".

Third Embodiment

Figure 14:
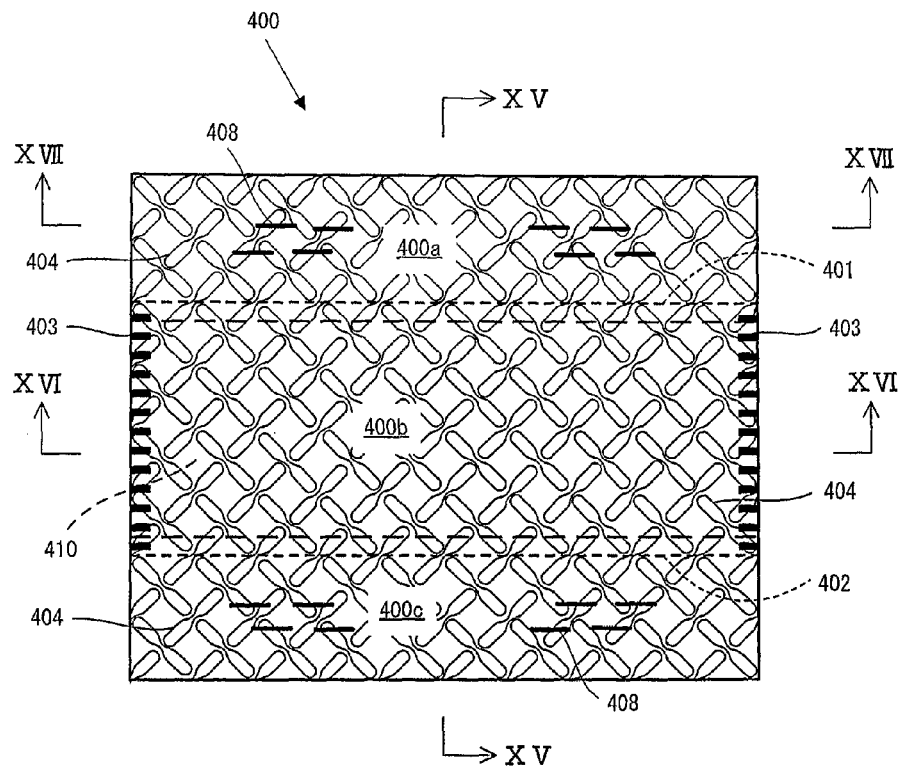
FIG. 14 shows a cleaning sheet 400 of a third embodiment in the unfolded state.
Figure 15:
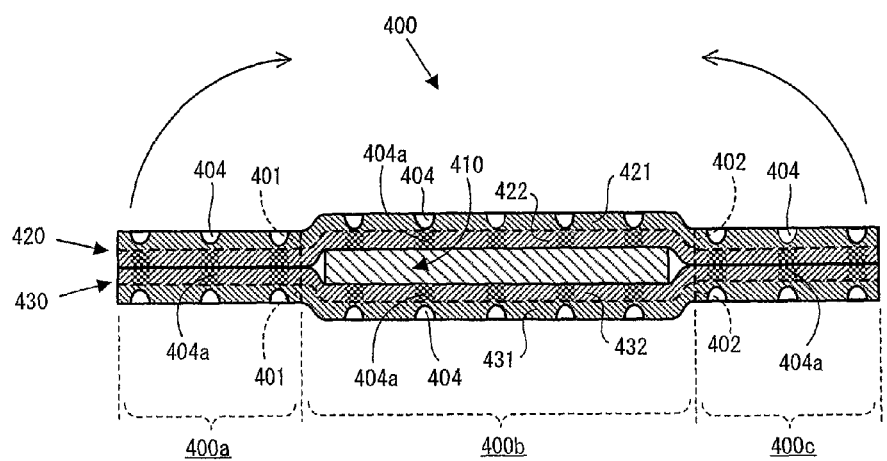
FIG. 15 is a sectional view taken along line XV-XV in FIG. 14.
Figure 16:
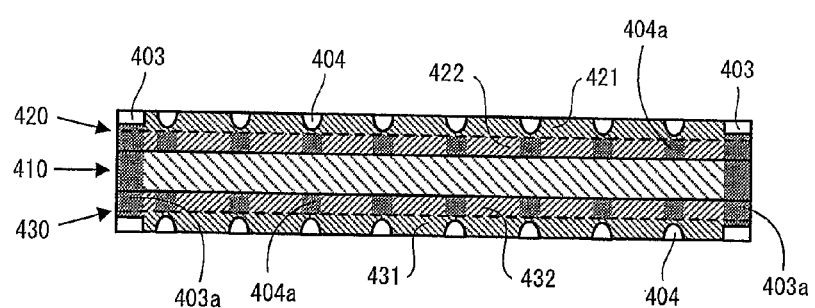
FIG. 16 is a sectional view taken along line XVI-XVI in FIG. 14.
Figure 17:
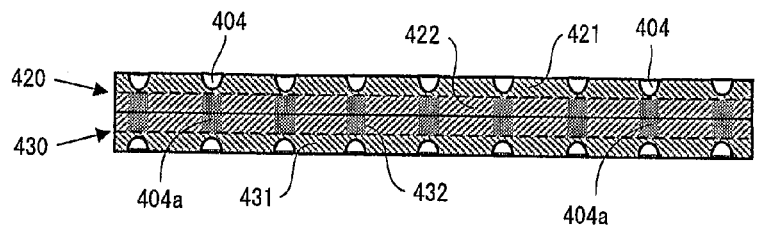
FIG. 17 is a sectional view taken along line XVII-XVII in FIG. 14.

A cleaning sheet 400 according to a third embodiment is now explained with reference to FIGS. 14 to 17. FIG. 14 shows the cleaning sheet 400 of the third embodiment in the unfolded state. FIG. 15 is a sectional view taken along line XV-XV (in the width direction) in FIG. 14. FIG. 16 is a sectional view taken along line XVI-XVI (in the length direction) in FIG. 14. FIG. 17 is a sectional view taken along line XVII-XVII (in the length direction) in FIG. 14. In this embodiment, a decorative hot embossed portion 404 is formed on a central portion 400b and end portions 400a, 400c of the cleaning sheet 400.

Like the cleaning sheet 200 of the first embodiment, the cleaning sheet 400 of this embodiment includes a hydrophilic single inner layer sheet 410 and hydrophobic single outer layer sheets 420, 430. Further, inner layers 422, 432 formed of fusion bonded layers are provided on the inner sides of the outer layer sheets 420, 430 (facing the inner layer sheet 410).

The inner layer sheet 410 has a shorter width than the width of the outer layer sheets 420, 430 and is centrally located between the outer layer sheets 420, 430 in the width direction of the outer layer sheets 420, 430.

Edges of the outer layer sheets 420, 430 on the both ends in the length direction are subjected to hot embossing (first hot embossing) for bonding the inner layer sheet 410 and the outer layer sheets 420, 430. In this embodiment, as described below, the central portion 400b and the end portions 400a, 400c of the cleaning sheet 400 are subjected to hot embossing (second hot embossing) for forming the hot embossed portion 404. Therefore, only the central portion 400b of the cleaning sheet 400 is subjected to hot embossing (first hot embossing) for bonding the inner layer sheet 410 and the outer layer sheets 420, 430. By this hot embossing, hot embossed portions 403 and bonded portions 403a in which the inner layer sheet 410 is bonded to the outer layer sheets 420, 430 are formed. Further, the end portions 400a, 400c of the cleaning sheet 400 may also be subjected to the hot embossing (first hot embossing) for bonding the inner layer sheet 410 and the outer layer sheets 420, 430.

Further, slits 408 are formed in the end portions 400a, 400c of the cleaning sheet 400 and can be engaged with the lock pieces 121 of the lock members 120.

In the cleaning sheet 400 of this embodiment, the surfaces of the outer layer sheets 420, 430 are subjected to hot embossing in the central portion 400b and the end portions 400a, 400c in order to form the hot embossed portion 404. The hot embossed portion 404 is formed such that a desired decorative pattern appears on the surface of the cleaning sheet 400 (which corresponds to the central portion 400b and the end portions 400a, 400c). In this embodiment, the hot embossed portion 404 is formed all over the surface of the cleaning sheet 400, so that the appearance of the cleaning sheet 400 is further enhanced compared with the second embodiment.

The hot embossed portion 404 has a patterned indented surface. Therefore, an object to be cleaned can be effectively cleaned with the hot embossed portion 404 formed on the central portion 400b of the cleaning sheet 400.

By this hot embossing, the hot embossed portion 404 is formed on the surfaces of the outer layer sheets 420, 430, and at the same time, bonded portions 404a are formed in the inner layer 422 of the outer layer sheet 420 and the inner layer 432 of the outer layer sheet 430. In the end portions 400a, 400c of the outer layer sheet 430, the inner layer 422 of the outer layer sheet 420 and the inner layer 432 of the outer layer sheet 430 are bonded together by the bonded portions 404a. On the other hand, in the central portion 400b of the cleaning sheet 400, the inner layer sheet 410 is not bonded to the inner layer 422 of the outer layer sheet 420 and the inner layer 432 of the outer layer sheet 430. This is caused, for example, by forming the inner layer sheet 410 of hydrophilic fibers. The inner layer sheet 410 can also be prevented from being bonded to the inner layer 422 of the outer layer sheet 420 and the inner layer 432 of the outer layer sheet 430 by adjusting the temperature or pressure of hot embossing (second hot embossing) for forming the hot embossed portion 404. Thus, the amount of the cleaning solution which is released from the inner layer sheet 410 to the outer layer sheet 420, 430 via the bonded portions can be controlled.

Fourth Embodiment

Figure 18:
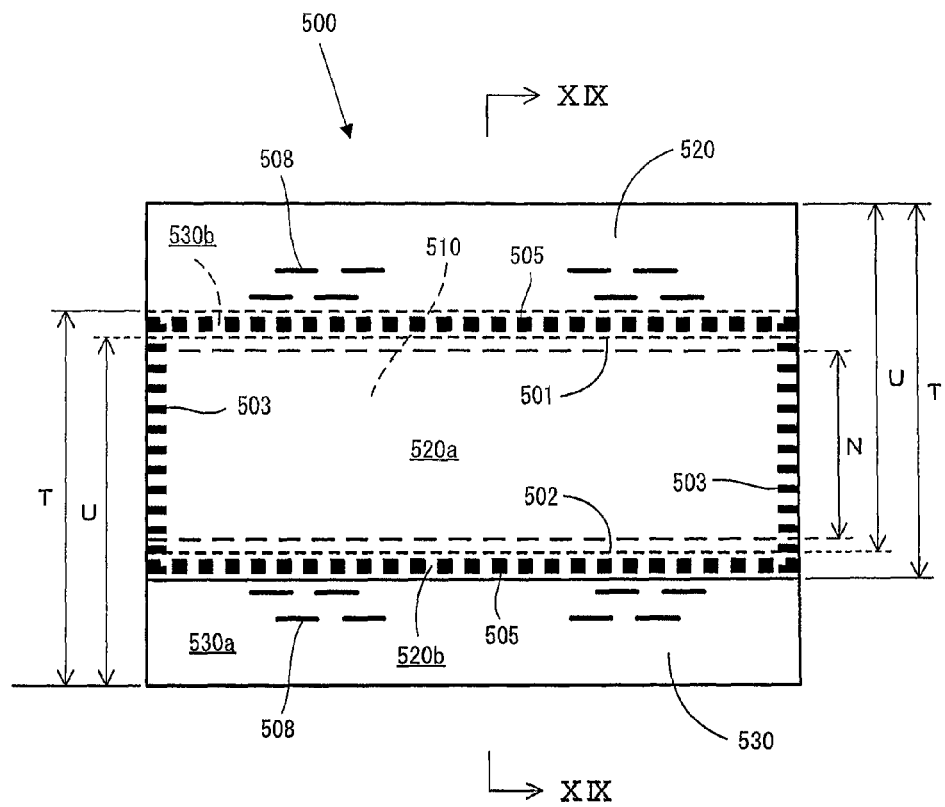
FIG. 18 shows a cleaning sheet 500 of a fourth embodiment in the unfolded state.
Figure 19:
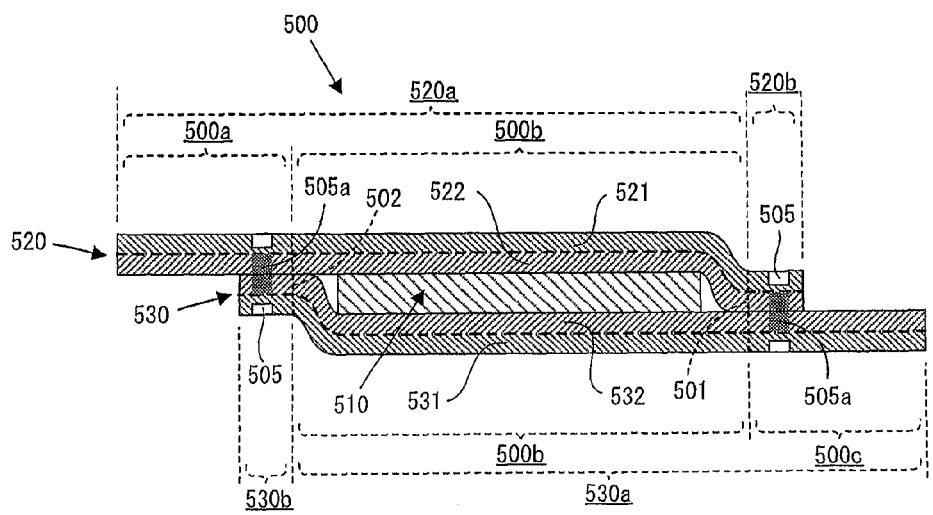
FIG. 19 is a sectional view taken along line XIX-XIX in FIG. 18.

A cleaning sheet 500 according to a fourth embodiment is now explained with reference to FIGS. 18 and 19. FIG. 18 shows the cleaning sheet 500 of the fourth embodiment in the unfolded state. FIG. 19 is a sectional view taken along line XIX-XIX (in the width direction) in FIG. 18. In this embodiment, outer layer sheets 520, 530 are disposed to be displaced in the width direction from each other with respect to an inner layer sheet 510.

Like the cleaning sheet 200 of the first embodiment, the cleaning sheet 500 of this embodiment includes a hydrophilic single inner layer sheet 510 and hydrophobic single outer layer sheets 520, 530. Further, inner layers 522, 532 formed of fusion bonded layers are provided on the inner sides of the outer layer sheets 520, 530 (facing the inner layer sheet 510).

The inner layer sheet 510 has a shorter width N than a width T of the outer layer sheets 520, 530. In this embodiment, the outer layer sheets 520, 530 are disposed to be displaced in the width direction (in the vertical direction as viewed in FIG. 18, or in the horizontal direction as viewed in FIG. 19) from each other with respect to the inner layer sheet 510.

Edges of the outer layer sheets 520, 530 on the both ends in the length direction are subjected to hot embossing (first hot embossing) for bonding the inner layer sheet 510 and the outer layer sheets 520, 530. In this embodiment, in which the outer layer sheets 520, 530 are disposed to be displaced in the width direction from each other with respect to the inner layer sheet 510, the central portion 500*b* of the cleaning sheet 500 is subjected to hot embossing (first hot embossing) for bonding the inner layer sheet 510 and the outer layer sheets 520, 530. It is necessary for this hot embossing (first hot embossing) to be performed on an area in which the inner layer sheet 510 and the outer layer sheets 520, 530 are overlaid one on another. By this hot embossing, hot embossed portions 503 and bonded portions 503*a* in which the inner layer sheet 510 is bonded to the outer layer sheets 520, 530 are formed.

Further, hot embossing (second hot embossing) for bonding the outer layer sheets 520, 530 is performed. The outer layer sheets 520, 530 are subjected to hot embossing (second hot embossing) for bonding the outer layer sheets 520, 530 on the both sides of the inner layer sheet 510 in the width direction along the length direction of the inner layer sheet 510. In this embodiment, an edge of one of the outer layer sheets on one side in the width direction and an edge of the other of the outer layer sheets on the other side in the width direction are subjected to hot embossing. For example, an edge 520*b* of the outer layer sheet 520 and an edge 530*b* of the outer layer sheet 530 are subjected to hot embossing. By this hot embossing, hot embossed portions 505 are formed, and at the same time, bonded portions 505*a* are formed in the inner layer 522 of the outer layer sheet 520 and the inner layer 532 of the outer layer sheet 530. The inner layer 522 of the outer layer sheet 520 and the inner layer 532 of the outer layer sheet 530 are bonded together by the bonded portions 505*a*.

Further, in order to form the above described decorative hot embossed portion, the hot embossed portions 505*a* for bonding the outer layer sheets 520, 530 may be formed by hot embossing for forming the decorative hot embossed portion.

Further, edges of the inner layer sheet 510 on the both sides in the width direction may also be subjected to hot embossing (first embossing) for bonding the inner layer sheet 510 and the outer layer sheets 520, 530 along the length direction of the inner layer sheet 510. In this case, consideration should be given to release of the cleaning solution from the inner layer sheet 510 to the outer layer sheets 520, 530.

In this embodiment, although the end portions 500*a*, 500*c* of the cleaning sheet 500 are formed by one of the outer layer sheets 520, 530 and the other of the outer layer sheets 520, 530, respectively, the size (width) of the inner layer sheet 510 remains unchanged, so that the size (width) of the cleaning area (the central portion 500*b*) remains unchanged. Therefore, in this embodiment, the extent of the cleaning sheet in the width direction can be adjusted while the cleaning ability is maintained unchanged. Further, in this embodiment, the end portions 500*a*, 500*c* of the cleaning sheet 500 have the same (or substantially the same) width.

Fifth Embodiment

Figure 20:
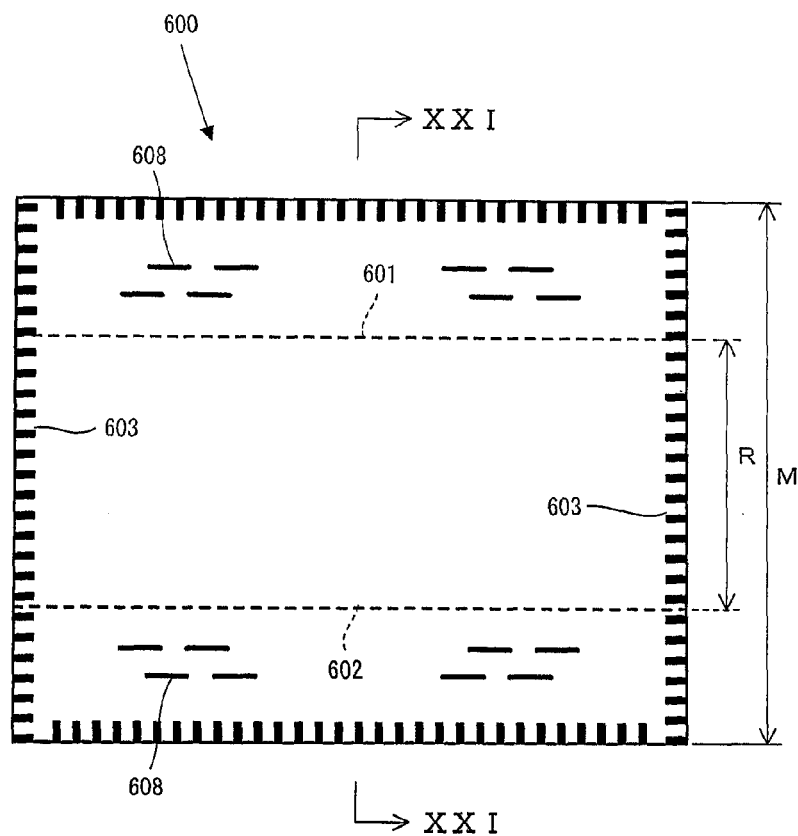
FIG. 20 shows a cleaning sheet 600 of a fifth embodiment in the unfolded state.
Figure 21:
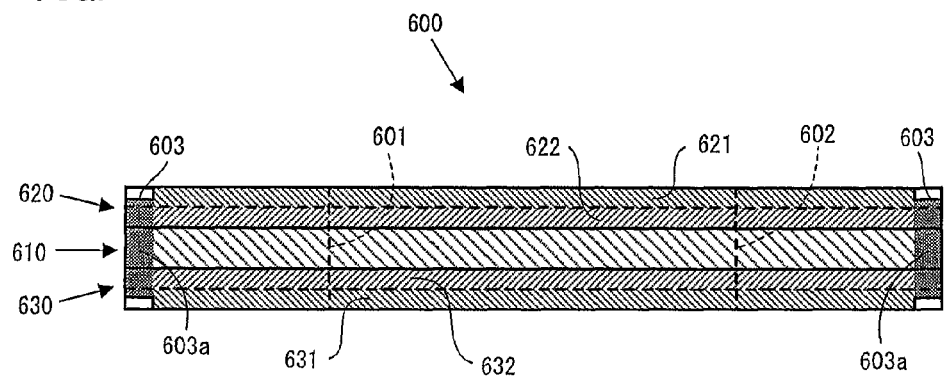
FIG. 21 is a sectional view taken along line XXI-XXI in FIG. 20.

A cleaning sheet 600 according to a fifth embodiment is now explained with reference to FIGS. 20 and 21. FIG. 20 shows the cleaning sheet 600 of the fifth embodiment in the unfolded state. FIG. 21 is a sectional view taken along line XXI-XXI (in the width direction) in FIG. 20. In this embodiment, an inner layer sheet 610 has the same (or substantially the same) width as outer layer sheets 620, 630.

Like the cleaning sheet 200 of the first embodiment, the cleaning sheet 600 of this embodiment includes a hydrophilic single inner layer sheet 610 and hydrophobic single outer layer sheets 620, 630. Further, inner layers 622, 632 formed of fusion bonded layers are provided on the inner sides of the outer layer sheets 620, 630 (facing the inner layer sheet 610). In this embodiment, the inner layer sheet 610 and the outer layer sheets 620, 630 have the same (or substantially the same) width.

Hot embossing (first hot embossing) for bonding the inner layer sheet 610 and the outer layer sheets 620, 630 is performed. In this embodiment, edges of the outer layer sheets 620, 630 along the outer periphery (edges on the both sides in the width direction and edges on the both sides in the length direction) are subjected to hot embossing (first hot embossing) for bonding the inner layer sheet 610 and the outer layer sheets 620, 630. By this hot embossing, hot embossed portions 603 and bonded portions 603*a* in which the inner layer sheet 610 is bonded to the outer layer sheets 620, 630 are formed. Only either edges of the outer layer sheets 620, 630 on the both sides in the width direction or edges of the outer layer sheets 620, 630 on the both sides in the length direction may be subjected to hot embossing (first hot embossing) for bonding the inner layer sheet 610 and the outer layer sheets 620, 630.

In this embodiment, the inner layer sheet can be impregnated with a larger amount of cleaning solution.

Sixth Embodiment

Figure 22:
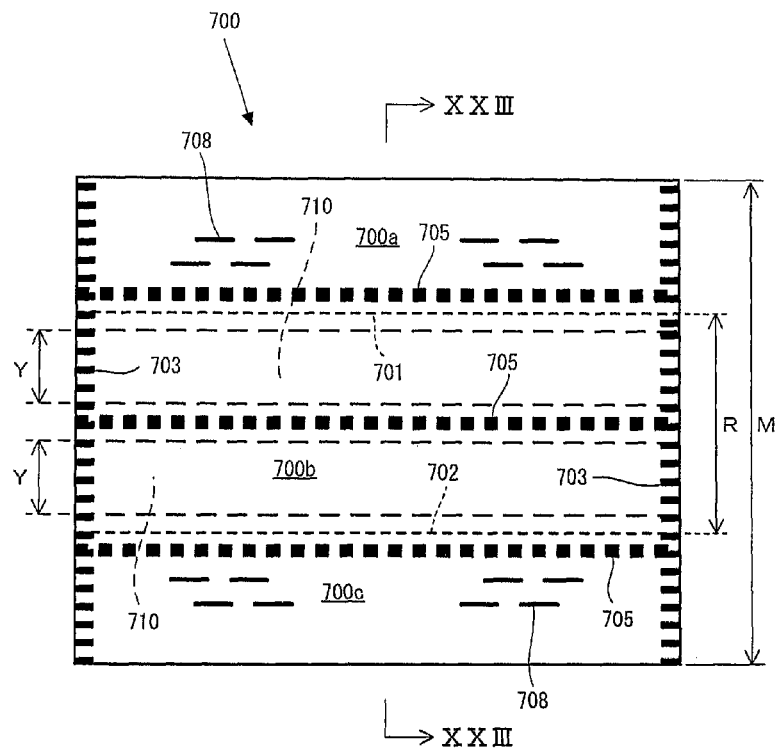
FIG. 22 shows a cleaning sheet 700 of a sixth embodiment in the unfolded state.
Figure 23:
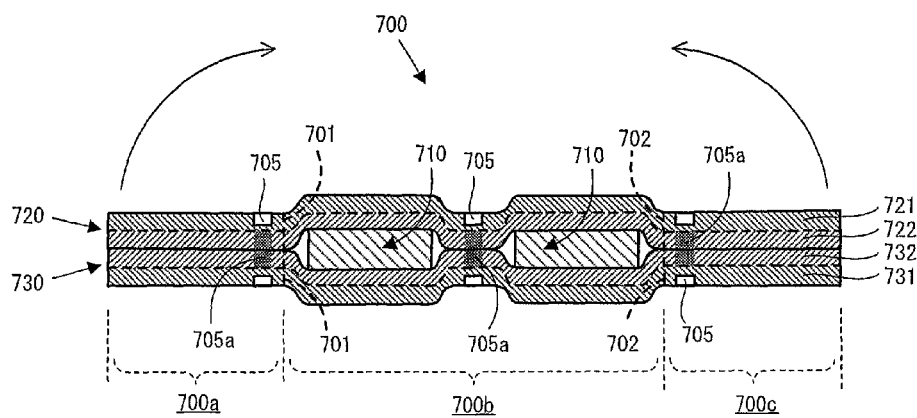
FIG. 23 is a sectional view taken along line XXIII-XXIII in FIG. 22.

A cleaning sheet 700 according to a sixth embodiment is now explained with reference to FIGS. 22 and 23. FIG. 22 shows the cleaning sheet 700 of the sixth embodiment in the unfolded state. FIG. 23 is a sectional view taken along line XXIII-XXIII (in the width direction) in FIG. 22. In this embodiment, a plurality of inner layer sheets 710 are used.

The cleaning sheet 700 of this embodiment includes a plurality of hydrophilic inner layer sheets 710 and hydrophobic single outer layer sheets 720, 730. Each of the inner layer sheets 710 has a width Y shorter than a width M of the outer layer sheets 720, 730. Further, the inner layer sheets 710 are disposed in a central portion 700*b* of the cleaning sheet 700.

Edges of the outer layer sheets 720, 730 on the both ends in the width direction are subjected to hot embossing (first hot embossing) for bonding the inner layer sheets 710 and the outer layer sheets 720, 730. By this hot embossing, hot embossed portions 703 and bonded portions 703*a* in which the inner layer sheets 710 are bonded to the outer layer sheets 720, 730 are formed. Further, in this embodiment, the inner layer sheets 710 are disposed in a central portion of the cleaning sheet 700. Therefore, only the central portion of the cleaning sheet 700 may be subjected to the hot embossing (first hot embossing).

Further, hot embossing (second hot embossing) for bonding the outer layer sheets 720, 730 is performed. In this embodiment, the outer layer sheets 720, 730 are subjected to hot embossing (second hot embossing) for bonding the outer layer sheets 720, 730 on the both sides of each of the inner layer sheets 710 in the width direction along the length direction of the inner layer sheet 710. By this hot embossing, hot embossed portions 705 are formed, and at the same time, bonded portions 705*a* are formed in the inner layer 722 of the outer layer sheet 720 and the inner layer 732 of the outer layer sheet 730. The inner layer 722 of the outer layer sheet 720 and the inner layer 732 of the outer layer sheet 730 are bonded together by the bonded portions 705*a*.

In the cleaning sheet 700 of this embodiment, a ribbed (indented) surface is formed on each of the outer layer sheets 720, 730 by hot embossing (second hot embossing) on the both sides of each of the inner layer sheets 710 in the width direction. The efficiency of cleaning an object to be cleaned is improved by the ribbed surfaces of the outer layer sheets 720, 730.

Further, hot embossing (second hot embossing) for bonding the outer layer sheets 720, 730 may not be performed between the inner layer sheets 710 and may only be performed on one side of the inner layer sheet 710 disposed on one side in the width direction and on the other side of the other inner layer sheet 710 disposed on the other side in the width direction.

In the above-described first to sixth embodiments of the cleaning sheet according to the first aspect of the invention, in the outer layer sheets disposed on the both sides of the impregnated element (e.g. inner layer sheet), a fusion bonded layer is formed on the side (inner side) of each of the outer layer sheets facing the impregnated element. In the fusion bonded layer, most of the fibers are joined together by fusion bonding, so that release of cleaning solution is controlled. Therefore, the amount of cleaning solution which is released from the impregnated element to the outer layer sheets can be controlled. Thus, an appropriate amount of cleaning solution can be released from the surface of the cleaning sheet during cleaning (when the surface of the cleaning sheet is put under load).

In order to form a fusion bonded layer on the inner side of the outer layer sheet, for example, thermoplastic fibers having a lower melting point than thermoplastic fibers provided on the outer side of the outer layer sheet may be provided on the inner side of the outer layer sheet, and the outer layer sheet may be heated at a temperature which is higher than the melting point of the thermoplastic fibers provided on the inner side and lower than the melting point of the thermoplastic fibers provided on the outer side.

It is essential for the impregnated element in the cleaning sheet of the first aspect of the invention to be hydrophilic, and the materials and shape of the impregnated element can be appropriately selected. As the impregnated element, an impregnated element which can be impregnated with a larger amount of cleaning solution is used. For example, a hydrophilic nonwoven fabric sheet is used as the impregnated element. In this case, a single nonwoven fabric sheet may be used, or a plurality of nonwoven fabric sheets may be used. By using a single nonwoven fabric sheet, the amount of cleaning solution which can be impregnated into the impregnated element can be increased. As the impregnated element, suitably, a nonwoven fabric sheet (spun lace nonwoven fabric sheet) manufactured by a hydroentangling method (water jet method) is used, and more suitably, a nonwoven fabric sheet (spun lace nonwoven fabric sheet) formed only of hydrophilic fibers (e.g. rayon fibers) by a hydroentangling method (water jet method) is used.

The impregnated element used in the cleaning sheet of the first aspect of the invention may be or may not be bonded to the outer layer sheet. When the impregnated element is bonded to the outer layer sheet, it is preferable to bond such that the total area of bonding between the impregnated element and the outer layer sheet is minimized. For example, the impregnated element is bonded to the outer layer sheet on the edges of the outer layer sheet. As a result, the amount of cleaning solution which is released from the impregnated element to the outer layer sheet via the bonded portions can be controlled.

The impregnated element used in the cleaning sheet of the first aspect of the invention can be disposed in appropriate position.

In order to attach the cleaning sheet to the head of the cleaning tool, the central portion of the cleaning sheet is placed to face the mounting side of the head, and the end portions of the cleaning sheet on the both sides of the central portion of the cleaning sheet are held by the lock pieces of the head. Therefore, when the cleaning sheet of the first aspect of the invention is attached to the head of the cleaning tool, preferably, the impregnated element is disposed in the central portion of the cleaning sheet, so that a larger amount of cleaning solution is distributed in the central portion of the cleaning sheet, while a smaller amount of cleaning solution is distributed in the end portions of the cleaning sheet. With such distribution property, the cleaning solution is released from the area (the central portion of the cleaning sheet) which is used for normal cleaning operation, and the cleaning solution is not released from the area (the end portions of the cleaning sheet) which is not used for normal cleaning operation. Therefore, the cleaning solution can be efficiently used. Further, the user's fingers can be prevented from contacting the cleaning solution when the user holds the end portions of the cleaning sheet and locks them by the lock pieces.

In the cleaning sheet of the first aspect of the invention, the surface of the cleaning sheet can be subjected to hot embossing (second hot embossing) in part or in its entirety in order to form a decorative hot embossed portion. The shape and position of the hot embossed portion can be appropriately selected according to the decorative pattern which appears on the surface of the cleaning sheet. Thus, the appearance of the cleaning sheet is enhanced.

Further, in the cleaning sheet of the first aspect of the invention, slits can be formed in the end portions which are held by the lock pieces of the head of the cleaning tool, and can be engaged with the lock pieces. The shape, position and number of the slits can be appropriately set. By provision of the slits, the end portions of the cleaning sheet can be easily engaged with the lock pieces of the head of the cleaning tool, so that ease of attachment of the cleaning sheet can be enhanced.

Second Aspect of the Invention

Second aspect of the invention is now explained in which a space is provided between a single inner layer sheet and outer layer sheets.

The second aspect of the invention corresponds to the above-described first to fifth embodiments.

In the first to fifth embodiments of the cleaning sheet of the second aspect of the invention, a single inner layer sheet is used as the impregnated element. The single inner layer sheet is bonded to the outer layer sheets on edges of one of the outer layer sheets, so that a space (clearance) is formed between the single inner layer sheet and the outer layer sheets. Due to the existence of the space, the amount of cleaning solution which is released from the inner layer sheet to the outer layer sheets can be controlled. Therefore, an appropriate amount of cleaning solution can be released from the surface of the cleaning sheet during cleaning (when the surface of the cleaning sheet is put under load). Further, by bonding the inner layer sheet and the outer layer sheets only on the edges of the outer layer sheet, the inner layer sheet can be impregnated with a larger amount of cleaning solution.

It is essential for the single inner layer sheet in the cleaning sheet of the second aspect of the invention to be hydrophilic, but suitably, a nonwoven fabric sheet (spun lace nonwoven fabric sheet) manufactured by a hydroentangling method (water jet method) is used. More suitably, a nonwoven fabric sheet (spun lace nonwoven fabric sheet) formed only of hydrophilic fibers (e.g. rayon fibers) by a hydroentangling method (water jet method) is used.

The area of the single inner layer sheet in the cleaning sheet of the second aspect of the invention may be equal (or substantially equal) to or smaller than that of the cleaning sheet.

When the cleaning sheet is attached to the head of the cleaning tool, the central portion of the cleaning sheet is disposed to face the mounting side of the head, and the end portions of the cleaning sheet on the both sides of the central portion are held by the lock pieces of the head. Therefore, when the cleaning sheet of the second aspect of the invention is attached to the head of the cleaning tool, preferably, the inner layer sheet having a smaller area than the central portion of the cleaning sheet is used and disposed in the central portion of the cleaning sheet, so that a larger amount of cleaning solution is distributed in the central portion of the cleaning sheet, while a smaller amount of cleaning solution is distributed in the end portions of the cleaning sheet. With such distribution property, the cleaning solution is released from the area (the central portion of the cleaning sheet) which is used for normal cleaning operation, and the cleaning solution is not released from the area (the end portions of the cleaning sheet) which is not used for normal cleaning operation. Therefore, the cleaning solution can be efficiently used. Further, the user's fingers can be prevented from contacting the cleaning solution when the user holds the end portions of the cleaning sheet and locks them by the lock pieces.

It is essential for the outer layer sheet in the cleaning sheet of the second aspect of the invention to be hydrophobic, but it is suitable that a fusion bonded layer is formed on the side (inner side) of the outer layer sheet facing the inner layer sheet. In the fusion bonded layer, most of the fibers are joined together by fusion bonding, so that release of cleaning solution is controlled. Therefore, the amount of cleaning solution which is released from the impregnated element to the outer layer sheet can be further controlled.

In order to form a fusion bonded layer on the inner side of the outer layer sheet, for example, thermoplastic fibers having a lower melting point than thermoplastic fibers provided on the outer side of the outer layer sheet may be provided on the inner side of the outer layer sheet, and the outer layer sheet may be heated at a temperature which is higher than the melting point of the thermoplastic fibers provided on the inner side and lower than the melting point of the thermoplastic fibers provided on the outer side.

In the cleaning sheet of the second aspect of the invention, the surface of the cleaning sheet can be subjected to hot embossing (second hot embossing) in part or in its entirety in order to form a decorative hot embossed portion. The shape and position of the hot embossed portion can be appropriately selected according to the decorative pattern which appears on the surface of the cleaning sheet. Thus, the appearance of the cleaning sheet is enhanced.

Further, in the cleaning sheet of the second aspect of the invention, slits can be formed in the end portions which are held by the lock pieces of the head of the cleaning tool, and can be engaged with the lock pieces. The shape, position and number of the slits can be appropriately set. By provision of the slits, the end portions of the cleaning sheet can be easily engaged with the lock pieces of the head of the cleaning tool, so that ease of attachment of the cleaning sheet can be enhanced.

Third Aspect of the Invention

Third aspect of the invention is now explained in which the impregnated element (e.g. inner layer sheet) is disposed in the central portion of the cleaning sheet.

The embodiments of the cleaning sheet of the third aspect of the invention correspond to the above-described first to fourth and sixth embodiments.

In the first to fourth and sixth embodiments of the cleaning sheet of the third aspect of the invention, the impregnated element is disposed in the central portion of the cleaning sheet.

When the cleaning sheet is attached to the head of the cleaning tool, the central portion of the cleaning sheet is disposed to face the mounting side of the head, and the end portions of the cleaning sheet on the both sides of the central portion of the cleaning sheet are held by the lock pieces of the head. In the cleaning sheet of the third aspect of the invention, in which the impregnated element is disposed in the central portion of the cleaning sheet, a larger amount of cleaning solution is distributed in the central portion of the cleaning sheet, while a smaller amount of cleaning solution is distributed in the end portions of the cleaning sheet. With such distribution property, the cleaning solution is released from the area (the central portion of the cleaning sheet) which is used for normal cleaning operation, and the cleaning solution is not released from the area (the end portions of the cleaning sheet) which is not used for normal cleaning operation. Therefore, the cleaning solution can be efficiently used. Further, the user's fingers can be prevented from contacting the cleaning solution when the user holds the end portions of the cleaning sheet and locks them by the lock pieces.

It is essential for the impregnated element in the cleaning sheet of the third aspect of the invention to be hydrophilic, and the materials and shape of the impregnated element can be appropriately selected. As the impregnated element, an impregnated element which can be impregnated with a larger amount of cleaning solution is used. For example, a hydrophilic nonwoven fabric sheet is used as the impregnated element. In this case, a single nonwoven fabric sheet may be used, or a plurality of nonwoven fabric sheets may be used. By using a single nonwoven fabric sheet, the amount of cleaning solution which can be impregnated into the impregnated element can be increased. As the impregnated element, suitably, a nonwoven fabric sheet (spun lace nonwoven fabric sheet) manufactured by a hydroentangling method (water jet method) is used, and more suitably, a nonwoven fabric sheet (spun lace nonwoven fabric sheet) formed only of hydrophilic fibers (e.g. rayon fibers) by a hydroentangling method (water jet method) is used.

The impregnated element used in the cleaning sheet of the third aspect of the invention may be or may not be bonded to the outer layer sheet. When the impregnated element is bonded to the outer layer sheet, it is preferable to bond such that the total area of bonding between the impregnated element and the outer layer sheet is minimized. For example, the impregnated element is bonded to the outer layer sheet on the edges of the outer layer sheet. As a result, the amount of cleaning solution which is released from the impregnated element to the outer layer sheet via the bonded portions can be controlled.

It is essential for the outer layer sheet in the cleaning sheet of the third aspect of the invention to be hydrophobic, but it is suitable that a fusion bonded layer is formed on the side (inner side) of the outer layer sheet facing the inner layer sheet. In the fusion bonded layer, most of the fibers are joined together by fusion bonding, so that release of cleaning solution is controlled. Therefore, the amount of cleaning solution which is released from the impregnated element to the outer layer sheet can be further controlled.

In order to form a fusion bonded layer on the inner side of the outer layer sheet, for example, thermoplastic fibers having a lower melting point than thermoplastic fibers provided on the outer side of the outer layer sheet may be provided on the inner side of the outer layer sheet, and the outer layer sheet may be heated at a temperature which is higher than the melting point of the thermoplastic fibers provided on the inner side and lower than the melting point of the thermoplastic fibers provided on the outer side.

In the cleaning sheet of the third aspect of the invention, the surface of the cleaning sheet can be subjected to hot embossing (second hot embossing) in part or in its entirety in order to form a decorative hot embossed portion. The shape and position of the hot embossed portion can be appropriately selected according to the decorative pattern which appears on the surface of the cleaning sheet. Thus, the appearance of the cleaning sheet is enhanced.

Further, in the cleaning sheet of the third aspect of the invention, slits can be formed in the end portions which are held by the lock pieces of the head of the cleaning tool, and can be engaged with the lock pieces. The shape, position and number of the slits can be appropriately set. By provision of the slits, the end portions of the cleaning sheet can be easily engaged with the lock pieces of the head of the cleaning tool, so that the ease of attachment of the cleaning sheet can be enhanced.

The invention is not limited to the constructions that have been described as the representative embodiments, but rather, may be added to, changed, replaced with alternatives or otherwise modified.

The constructions that have been described as the representative embodiments can be used singly or in combination of appropriately selected ones of them.

The method of bonding the impregnated element (e.g. inner layer sheet) to the outer layer sheets and the method of bonding the outer layer sheets together are not limited to the hot embossing method, but various other bonding methods can be used.

Usage patterns of the cleaning sheet, or whether, in use, the cleaning sheet is attached to a cleaning tool or the cleaning sheet is directly held by user's hand, can be selected. When the cleaning sheet is exclusively used by direct hand-holding, the folding lines can be omitted.

The constructions of the cleaning sheet is not limited to those described in the above-described embodiments. For example, the number of the sheets forming the cleaning sheet can be appropriately selected. As the sheets forming the cleaning sheet, sheets formed of various materials or sheets manufactured by various manufacturing methods can be used.

As the cleaning tool, various cleaning tools having a head (cleaning sheet mounting member) to which the cleaning sheet is attached can be used. The head of the cleaning tool has a mounting side on which the central portion of the cleaning sheet is placed and lock pieces for removably holding the end portions of the cleaning sheet.

Further, having regard to the invention and representative embodiment of the invention, following technical aspects can be provided:

Technical Aspects of the Invention

Aspect 1. A cleaning sheet comprising:
a hydrophobic first nonwoven fabric sheet,
a hydrophobic second nonwoven fabric sheet and
a hydrophilic impregnated element impregnated with cleaning solution, the impregnated element being disposed between the first nonwoven sheet and the second nonwoven sheet, wherein the first nonwoven fabric sheet and the second nonwoven fabric sheet are integrated to each other with the impregnated element disposed between the first and second nonwoven fabric sheets,
wherein the first nonwoven fabric sheet has a fusion bonded layer and the fusion bonded layer controls the amount of release of cleaning solution of the impregnated element from the outer surface of the first nonwoven fabric sheet.

Aspect 2. The cleaning sheet as defined in aspect 1, wherein the fusion bonded layer is provided at a side of the first nonwoven fabric sheet facing the impregnated element.

Aspect 3. The cleaning sheet as defined in aspect 1 or 2, wherein the first nonwoven fabric sheets is provided with fibers containing thermoplastic fibers and thermoplastic fibers provided on the side of the first nonwoven fabric sheet facing the impregnated element has a lower melting point than thermoplastic fibers provided on the sides opposite from the sides facing the impregnated element, whereby the fusion bonded layer is provided at a side of the first nonwoven fabric sheet facing the impregnated element.

Aspect 4. The cleaning sheet as defined in any one of aspects 1 to 3, wherein the second nonwoven fabric sheet also has a fusion bonded layer and the fusion bonded layer of the second nonwoven fabric sheet controls the amount of release of cleaning solution of the impregnated element from the outer surface of the second nonwoven fabric sheet.

Aspect 5. The cleaning sheet as defined in aspect 4, wherein the fusion bonded layer of the second nonwoven fabric sheet is provided at a side facing the impregnated element.

Aspect 6. The cleaning sheet as defined in aspect 5, wherein the second nonwoven fabric sheets is provided with fibers containing thermoplastic fibers and thermoplastic fibers provided on the side of the second nonwoven fabric sheet facing the impregnated element has a lower melting point than thermoplastic fibers provided on the sides opposite from the sides facing the impregnated element, whereby the fusion bonded layer is provided at a side of the second nonwoven fabric sheet facing the impregnated element.

Aspect 7. The cleaning sheet as defined in any one of aspects 1 to 6, wherein each of the first nonwoven fabric sheet and the second nonwoven fabric sheet is separately formed as a single unitary sheet body and bonded to each other.

Aspect 8. The cleaning sheet as defined in any one of aspects 1 to 6, wherein each of the first nonwoven fabric sheet and the second nonwoven fabric sheet are formed as a single unitary sheet body.

Aspect 9. The cleaning sheet as defined in any one of aspects 1 to 8, wherein the impregnated element is defined by a third nonwoven fabric sheet.

Aspect 10. The cleaning sheet as defined in aspect 9, wherein the third nonwoven sheet is formed as a single unitary sheet body.

Aspect 11. The cleaning sheet as defined in any one of aspects 1 to 10, wherein a space is provided between the first nonwoven fabric sheet and the impregnated element and the amount of release of cleaning solution of the impregnated element from the outer surface of the first nonwoven fabric is controlled.

Aspect 12. The cleaning sheet as defined in any one of aspects 1 to 11 further comprising:
a third nonwoven fabric sheet as a single unitary sheet body, the third nonwoven fabric sheet defining the impregnated element,
a main cleaning area provided with the first nonwoven fabric sheet corresponding to the disposition of the third nonwoven fabric sheet, a bonding area to bond the third nonwoven fabric sheet to the first nonwoven fabric sheet, the bonding area being an area outside the main cleaning area and a space provided at the main cleaning area between the first nonwoven fabric sheet and the third nonwoven fabric sheet, wherein the space controls the amount of release of cleaning solution of the impregnated element from the outer surface of the first nonwoven fabric sheet.

Aspect 13. The cleaning sheet as defined in any one of aspects 1 to 12, wherein the impregnated element includes rayon fibers to provide moisture retentivity.

Aspect 14. The cleaning sheet as defined in any one of aspects 1 to 13, wherein a nonwoven fabric sheet manufactured by a hydroentangling method and having a patterned indented surface is used as the impregnated element.

Aspect 15. The cleaning sheet as defined in any one of aspects 1 to 14, wherein hot embossing is provided at least on the surface of the first nonwoven fabric sheet.

Aspect 16. The cleaning sheet as defined in any one of aspects 1 to 15, wherein a slit is provided at least with one of the first and second nonwoven fabric sheets, the slit being engageable with a cleaning tool.

Aspect 17. A cleaning tool comprising a cleaning sheet mounting member and the cleaning sheet according to any one of aspects 1 to 16, wherein the cleaning sheet mounting member has a mounting side and lock pieces and the cleaning sheet has a central portion placed on the mounting side of the cleaning sheet mounting member and end portions formed on the both sides of the central portion and held by the lock pieces of the cleaning sheet mounting member.

Aspect 18. A cleaning sheet comprising:

a hydrophobic first nonwoven fabric sheet, a hydrophobic second nonwoven fabric sheet and a third nonwoven fabric sheet as a single unitary sheet body, the third nonwoven fabric sheet impregnated with cleaning solution and disposed between the first nonwoven sheet and the second nonwoven sheet, a main cleaning area provided with the first nonwoven fabric sheet corresponding to the disposition of the third nonwoven fabric sheet, a bonding area to bond the third nonwoven fabric sheet to the first nonwoven fabric sheet, the bonding area being an area outside the main cleaning area and a space provided at the main cleaning area between the first nonwoven fabric sheet and the third nonwoven fabric sheet, wherein the space controls the amount of release of cleaning solution of the third nonwoven fabric sheet from the outer surface of the first nonwoven fabric sheet.

Aspect 19. The cleaning sheet as defined in aspect 18, wherein the first nonwoven fabric sheet has a fusion bonded layer at the main cleaning area and the fusion bonded layer controls the amount of a release of cleaning solution of the third nonwoven fabric sheet from the outer surface of the first nonwoven fabric sheet.

Aspect 20. The cleaning sheet as defined in aspect 19, wherein the fusion bonded layer is provided at a side facing the third nonwoven fabric sheet.

Aspect 21. The cleaning sheet as defined in aspect 20, wherein the first nonwoven fabric sheets is provided with fibers containing thermoplastic fibers and thermoplastic fibers provided on the side of the first nonwoven fabric sheet facing the third nonwoven fabric sheet has a lower melting point than thermoplastic fibers provided on the sides opposite from the sides facing the third nonwoven fabric sheet, whereby the fusion bonded layer is formed at a side of the first nonwoven fabric sheet facing the third nonwoven fabric sheet.

Aspect 22. The cleaning sheet as defined in any one of aspects 18 to 21, wherein the second nonwoven fabric sheet also has a fusion bonded layer and the fusion bonded layer of the second nonwoven fabric sheet controls the amount of release of cleaning solution of the third nonwoven fabric sheet from the outer surface of the second nonwoven fabric sheet.

Aspect 23. The cleaning sheet as defined in aspect 22, wherein the fusion bonded layer of the second nonwoven fabric sheet is provided at a side of the second nonwoven fabric sheet facing the third nonwoven fabric sheet.

Aspect 24. The cleaning sheet as defined in aspect 23, wherein the second nonwoven fabric sheets is provided with fibers containing thermoplastic fibers and thermoplastic fibers provided on the side of the second nonwoven fabric sheet facing the third nonwoven fabric sheet has a lower melting point than thermoplastic fibers provided on the sides opposite from the sides facing the third nonwoven fabric sheet.

Aspect 25. The cleaning sheet as defined in any one of aspects 18 to 24, wherein each of the first nonwoven fabric sheet and the second nonwoven fabric sheet is separately formed as a single unitary sheet body and bonded to each other.

Aspect 26. The cleaning sheet as defined in any one of aspects 18 to 24, wherein each of the first nonwoven fabric sheet and the second nonwoven fabric sheet are formed as a single unitary sheet body.

Aspect 27. The cleaning sheet as defined in any one of aspects 18 to 26, wherein the third nonwoven fabric sheet includes rayon fibers to provide moisture retentivity.

Aspect 28. The cleaning sheet as defined in any one of aspects 18 to 27, wherein a nonwoven fabric sheet manufactured by a hydroentangling method and having a patterned indented surface is used as the third nonwoven fabric sheet.

Aspect 29. The cleaning sheet as defined in any one of aspects 18 to 28, wherein hot embossing is provided at least on the surface of the first nonwoven fabric sheet.

Aspect 30. The cleaning sheet as defined in any one of aspects 18 to 29, wherein a slit is provided at least with one of the first and second nonwoven fabric sheets, the slit being engageable with a cleaning tool.

Aspect 31. A cleaning tool comprising a cleaning sheet mounting member and the cleaning sheet according to any one of aspects 18 to 30, wherein the cleaning sheet mounting member has a mounting side and lock pieces and the cleaning sheet has a central portion placed on the mounting side of the cleaning sheet mounting member and end portions formed on the both sides of the central portion and held by the lock pieces of the cleaning sheet mounting member.

Aspect 32. A cleaning sheet attachable to a cleaning tool with a cleaning sheet mounting member having a mounting side and lock pieces, the cleaning sheet having a central portion placed on the mounting side of the cleaning sheet mounting member and having end portions formed on the both sides of the central portion and held by the lock pieces of the cleaning sheet mounting member, the cleaning sheet comprising:

a hydrophobic first nonwoven fabric sheet, a hydrophobic second nonwoven fabric sheet, a hydrophilic impregnated element impregnated with cleaning solution, the impregnated element being disposed between the first nonwoven sheet and the second nonwoven sheet, wherein the first nonwoven fabric sheet and the second nonwoven fabric sheet are bonded to each other while the impregnated element is disposed at the central portion between the first and second nonwoven fabric sheets.

Aspect 33. The cleaning sheet as defined in aspect 32, wherein the first nonwoven fabric sheet has a fusion bonded layer and the fusion bonded layer controls the amount of release of cleaning solution of the impregnated element from the outer surface of the first nonwoven fabric sheet.

Aspect 34. The cleaning sheet as defined in aspect 33, wherein the fusion bonded layer is provided at a side of the first nonwoven fabric sheet facing the impregnated element.

Aspect 35. The cleaning sheet as defined in aspect 34, wherein the first nonwoven fabric sheets is provided with fibers containing thermoplastic fibers and thermoplastic fibers provided on the side of the first nonwoven fabric sheet facing the impregnated element has a lower melting point than thermoplastic fibers provided on the sides opposite from the sides facing the impregnated element, whereby the fusion bonded layer is provided at a side of the first nonwoven fabric sheet facing the impregnated element.

Aspect 36. The cleaning sheet as defined in any one of aspects 32 to 35, wherein the second nonwoven fabric sheet also has a fusion bonded layer and the fusion bonded layer of the second nonwoven fabric sheet controls the amount of release of cleaning solution of the impregnated element from the outer surface of the second nonwoven fabric sheet.

Aspect 37. The cleaning sheet as defined in aspect 36, wherein the fusion bonded layer of the second nonwoven fabric sheet is provided at a side facing the impregnated element.

Aspect 38. The cleaning sheet as defined in aspect 37, wherein the second nonwoven fabric sheets is provided with fibers containing thermoplastic fibers and thermoplastic fibers provided on the side of the second nonwoven fabric sheet facing the impregnated element has a lower melting point than thermoplastic fibers provided on the sides opposite from the sides facing the impregnated element, whereby the fusion bonded layer is provided at a side of the second nonwoven fabric sheet facing the impregnated element.

Aspect 39. The cleaning sheet as defined in any one of aspects 32 to 38, wherein each of the first nonwoven fabric sheet and the second nonwoven fabric sheet is separately formed as a single unitary sheet body and bonded to each other.

Aspect 40. The cleaning sheet as defined in any one of aspects 32 to 39, wherein each of the first nonwoven fabric sheet and the second nonwoven fabric sheet are formed as a single unitary sheet body.

Aspect 41. The cleaning sheet as defined in any one of aspects 32 to 40, wherein the impregnated element is defined by a third nonwoven fabric sheet.

Aspect 42. The cleaning sheet as defined in aspect 41, wherein the third nonwoven sheet is formed as a single unitary sheet body.

Aspect 43. The cleaning sheet as defined in any one of aspects 32 to 42, wherein a space is provided between the first nonwoven fabric sheet and the impregnated element and the amount of release of cleaning solution of the impregnated element from the outer surface of the first nonwoven fabric is further controlled.

Aspect 44. The cleaning sheet as defined in any one of aspects 32 to 43 further comprising:
a third nonwoven fabric sheet as a single unitary sheet body, the third nonwoven fabric sheet defining the impregnated element,
a central portion provided with the first nonwoven fabric sheet corresponding to the disposition of the third nonwoven fabric sheet,
a bonding area to bond the third nonwoven fabric sheet to the first nonwoven fabric sheet, the bonding area being an area outside the main cleaning area and
a space provided at the central portion between the first nonwoven fabric sheet and the third nonwoven fabric sheet,
wherein the space controls the amount of release of cleaning solution of the third nonwoven fabric sheet from the outer surface of the first nonwoven fabric sheet.

Aspect 45. The cleaning sheet as defined in any one of aspects 32 to 44, wherein the impregnated element includes rayon fibers to provide moisture retentivity.

Aspect 46. The cleaning sheet as defined in any one of aspects 32 to 45, wherein a nonwoven fabric sheet manufactured by a hydroentangling method and having a patterned indented surface is used as the impregnated element.

Aspect 47. The cleaning sheet as defined in any one of aspects 32 to 46, wherein hot embossing is provided at least on the surface of the first nonwoven fabric sheet.

Aspect 48. The cleaning sheet as defined in any one of aspects 32 to 47, wherein a slit is provided at least with one of the first and second nonwoven fabric sheets, the slit being engageable with a cleaning tool.

Aspect 49. A cleaning tool comprising a cleaning sheet mounting member and the cleaning sheet according to any one of aspects 32 to 48,
wherein the cleaning sheet mounting member has a mounting side and lock pieces and
the cleaning sheet has a central portion placed on the mounting side of the cleaning sheet mounting member and end portions formed on the both sides of the central portion and held by the lock pieces of the cleaning sheet mounting member.

DESCRIPTION OF NUMERALS 100 cleaning tool
110 head (cleaning sheet mounting member)
120 lock member
121 lock piece
130 pipe
131 connecting mechanism
150 handle
200, 300, 400, 500, 600, 700 cleaning sheet
200a, 200c, 300a. 300c, 400a, 400c, 500a, 500c, 600a, 600c, 700a, 700c end portion
200b, 300b, 400b, 500b, 600b, 700b central portion (cleaning portion)
201, 202, 301, 302, 401, 402, 501, 502, 601, 602, 701, 702 folding line
208, 308, 408, 508, 608, 708 slit
210, 310, 410, 510, 610, 710 inner layer sheet
220, 230, 320, 330, 420, 430, 520, 530, 620, 630, 720, 730 outer layer sheet
221, 231, 321, 331, 421, 431, 521, 531, 621, 631, 721, 731 outer layer
222, 232, 322, 332, 422, 432, 522, 532, 622, 632, 722, 732 inner layer (fusion bonded layer)
203, 303, 304, 403, 404, 503, 505, 603, 703, 705 hot embossed portion

The invention claimed is:

1. A cleaning sheet comprising:
a hydrophobic first nonwoven fabric sheet,
a hydrophobic second nonwoven fabric sheet and
a hydrophilic impregnated element impregnated with cleaning solution, the impregnated element being disposed between the first nonwoven sheet and the second nonwoven sheet, wherein the first nonwoven fabric sheet and the second nonwoven fabric sheet are integrated to each other with the impregnated element disposed between the first and second nonwoven fabric sheets,
wherein:
the first nonwoven fabric sheet has a fusion bonded layer provided at a side of the first nonwoven fabric sheet facing the impregnated element which fusion bonded layer controls the amount of release of cleaning solution of the impregnated element from the outer surface of the first nonwoven fabric sheet,
the first nonwoven fabric sheet is provided with fibers containing thermoplastic fibers and thermoplastic fibers provided on the side of the first nonwoven fabric sheet facing the impregnated element has a lower melting point than thermoplastic fibers provided on the sides opposite from the sides facing the impregnated element, whereby the fusion bonded layer is provided at a side of the first nonwoven fabric sheet facing the impregnated element,
the second nonwoven fabric sheet also has a fusion bonded layer provided at a side facing the impregnated element and the fusion bonded layer of the second nonwoven fabric sheet controls the amount of release of cleaning solution of the impregnated element from the outer surface of the second nonwoven fabric sheet, and
the second nonwoven fabric sheets is provided with fibers containing thermoplastic fibers and thermoplastic fibers provided on the side of the second nonwoven fabric sheet facing the impregnated element has a lower melting point than thermoplastic fibers provided on the sides opposite from the sides facing the impregnated element, whereby the fusion bonded layer is provided at a side of the second nonwoven fabric sheet facing the impregnated element.

2. The cleaning sheet as defined in claim 1, wherein each of the first nonwoven fabric sheet and the second nonwoven fabric sheet is separately formed as a single unitary sheet body and bonded to each other.

3. The cleaning sheet as defined in claim 1, wherein each of the first nonwoven fabric sheet and the second nonwoven fabric sheet are formed as a single unitary sheet body.

4. The cleaning sheet as defined in claim 1, wherein the impregnated element is defined by a third nonwoven fabric sheet.

5. The cleaning sheet as defined in claim 4, wherein the third nonwoven sheet is formed as a single unitary sheet body.

6. The cleaning sheet as defined in claim 1, wherein a space is provided between the first nonwoven fabric sheet and the impregnated element and the amount of release of cleaning solution of the impregnated element from the outer surface of the first nonwoven fabric is controlled.

7. The cleaning sheet as defined in claim 1, further comprising:
a third nonwoven fabric sheet as a single unitary sheet body, the third nonwoven fabric sheet defining the impregnated element,
a main cleaning area provided with the first nonwoven fabric sheet corresponding to the disposition of the third nonwoven fabric sheet,
a bonding area to bond the third nonwoven fabric sheet to the first nonwoven fabric sheet, the bonding area being an area outside the main cleaning area and
a space provided at the main cleaning area between the first nonwoven fabric sheet and the third nonwoven fabric sheet,
wherein the space controls the amount of release of cleaning solution of the impregnated element from the outer surface of the first nonwoven fabric sheet.

8. The cleaning sheet as defined in claim 1, wherein the impregnated element includes rayon fibers to provide moisture retentivity.

9. The cleaning sheet as defined in claim 1, wherein a nonwoven fabric sheet manufactured by a hydroentangling method and having a patterned indented surface is used as the impregnated element.

10. The cleaning sheet as defined in claim 1, wherein hot embossing is provided at least on the surface of the first nonwoven fabric sheet.

11. The cleaning sheet as defined in claim 1, wherein a slit is provided at least with one of the first and second nonwoven fabric sheets, the slit being engageable with a cleaning tool.

12. A cleaning tool comprising a cleaning sheet mounting member and the cleaning sheet according to claim 1, wherein the cleaning sheet mounting member has a mounting side and lock pieces and the cleaning sheet has a central portion placed on the mounting side of the cleaning sheet mounting member and end portions formed on the both sides of the central portion and held by the lock pieces of the cleaning sheet mounting member.

* * * * *